Oct. 18, 1949.  H. G. BAERWALD  2,485,129
PIEZOELECTRIC CRYSTAL PLATE
Filed March 19, 1945  5 Sheets-Sheet 1
FIG. 1
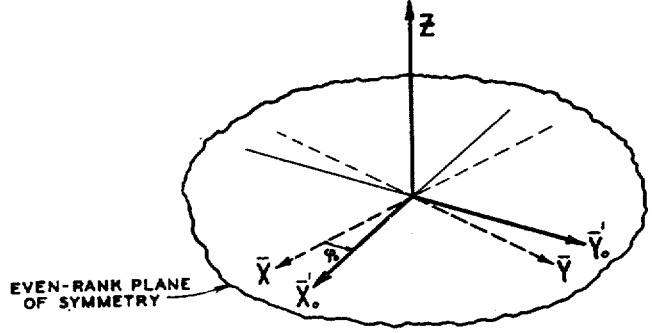
A
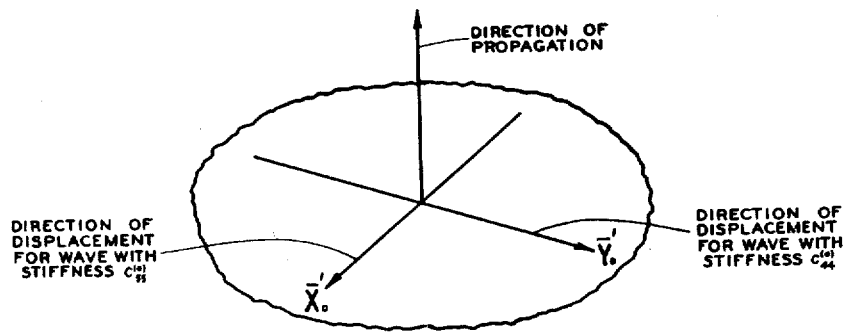
B  DOUBLE SERIES UNCONDITIONALLY PURE SHEAR WAVE
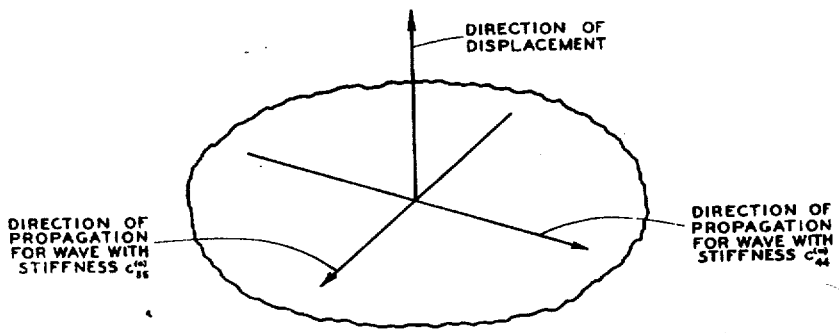
C  SINGLE SERIES CONDITIONALLY PURE SHEAR WAVES
INVENTOR.
HANS G. BAERWALD
BY
ATTORNEY

FIG. 3
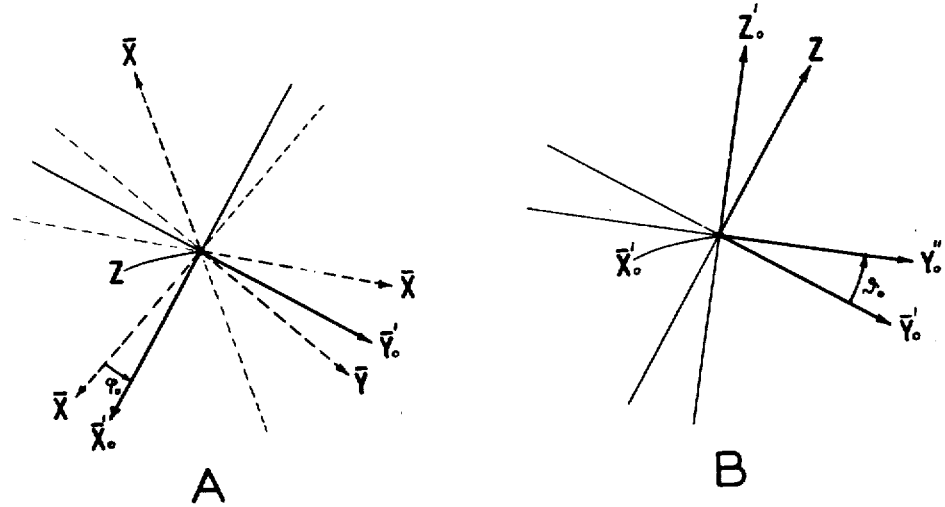
A
B
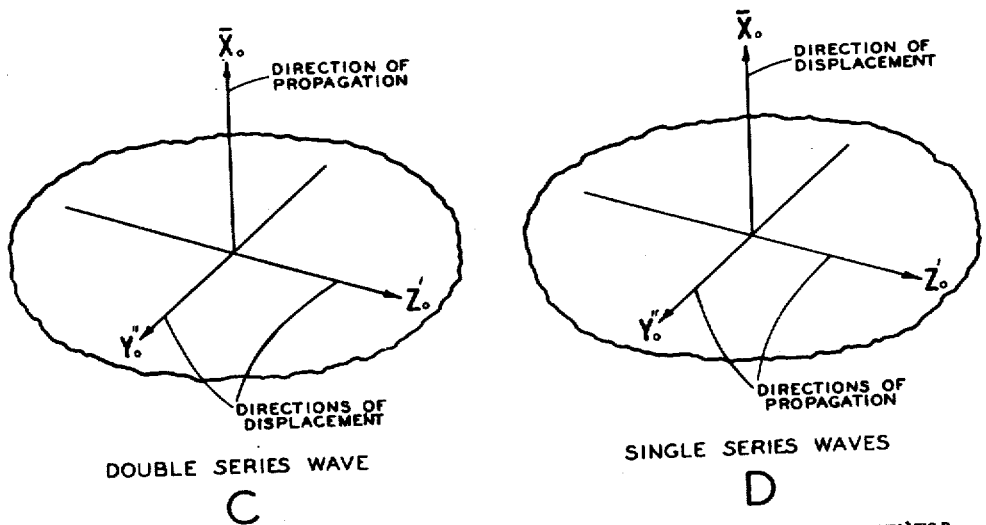
DOUBLE SERIES WAVE
C
SINGLE SERIES WAVES
D
INVENTOR.
HANS G. BAERWALD

INVENTOR.
HANS G. BAERWALD

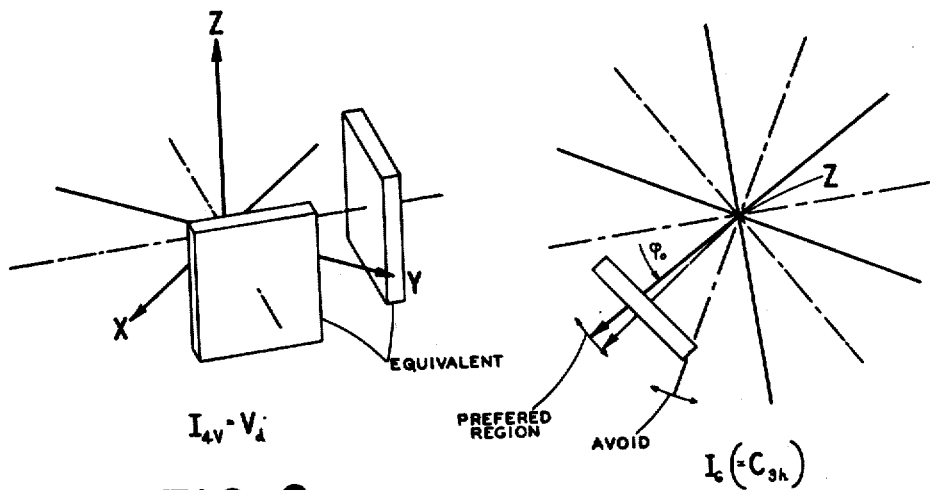
FIG. 9 — $I_{4v} \cdot V_d$
FIG. 10 — $I_6(-C_{3h})$
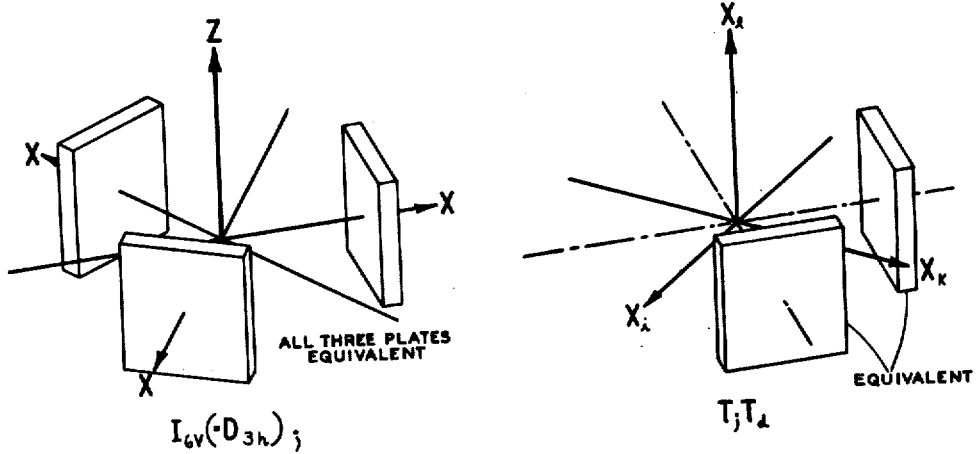
FIG. 11 — $I_{6v}(-D_{3h})$; $C_{3v}$ DOUBLE SERIES
FIG. 12 — $T_j T_d$ Patented Oct. 18, 1949

2,485,129

UNITED STATES PATENT OFFICE 2,485,129

PIEZOELECTRIC CRYSTAL PLATE

Hans G. Baerwald, Cleveland Heights, Ohio, assignor to The Brush Development Company, Cleveland, Ohio, a corporation of Ohio Application March 19, 1945, Serial No. 583,477

3 Claims. (Cl. 171—327)

This invention relates to cuts of piezoelectric crystals and more particularly to thickness-controlled shear crystal plates for frequency control or as filter elements in the upper radio and ultra-high frequency range.

The fundamental object of the invention is to provide, from the complete set of crystal classes and from the cuts or orientations therein possible by virtue of the laws of phenomenological crystal physics, crystal plates with the following three fundamental properties:

1. Crystal plates with these orientations are excitable in simple-mode thickness-controlled elastic shear vibrations by longitudinal electric fields and/or dielectric displacements;
2. No elastic and dielectric interaction of these shear modes with any other modes of vibration exists;
3. These orientations are independent of the physical constants of any particular material belonging to one of the specified classes of crystallographic symmetry as well as of extraneous physical conditions such as temperature. For the purpose of this description, cuts with these three properties are called piezoelectric unconditionally pure thickness-controlled shear cuts.

Another object is to provide, for any one among several crystal classes, a finite variety of piezoelectric unconditionally pure thickness-controlled shear cuts each having the same single simple mode, frequency constant, dielectric constant, and piezoelectric coupling constant.

Another object is to provide, for one and the same crystal class, two piezoelectric unconditionally pure thickness-controlled shear cuts with in general different single simple modes, frequency, and piezoelectric coupling constants.

Another object is to provide piezoelectric unconditionally pure thickness-controlled shear cuts with two simple, but in general mutually different modes, frequency and piezoelectric coupling constants, the modes being free from mutual interaction except via the longitudinal electrical component linked with both.

Another object is to provide, from several crystal classes, piezoelectric unconditionally pure thickness-controlled shear cuts whose azimuthal angle of orientation about the major crystallographic axis is entirely arbitrary, all relevant physical properties such as piezoelectric coupling, frequency, and dielectric constants being independent of that angle.

In order to explain more fully the objects of this invention, their position to the known art, and the claimed means of achieving them, it will be helpful to re-state certain results of the theory of dynamics of aeolotropic continua and of the tensorial (phenomenological) treatment of crystallographic properties, from which will flow some special concepts and definitions basic to this invention.

It is well known (see, e. g., E. B. Christoffel: "Gesammelte Mathematische Abhandlungen," vol. 2, page 81, Leipzig, 1910; Lord Kelvin: "Baltimore Lectures on Molecular Dynamics and the Wave Theory of Light," Lecture XI, pages 132–134 and XII, pages 135–136; A. E. H. Love: "A Treatise on the Mathematical Theory of Elasticity," 4th edition, Cambridge University Press, 1934, ch. XIII, No. 208) that in a general elastic aeolotropic infinitely extended medium, there exist for any given direction, called direction of propagation, a triplet of plane waves having this direction normal to its phase fronts; that its three phase (propagation) velocities are in general different from each other; that the three displacement vectors associated with the individua of the triplet form an orthogonal set and are in general inclined to the direction of propagation; and that in general each wave carries all six stress components. The dependence of the magnitude of the phase velocity, of the direction and relative magnitude of the displacement, and of the relative magnitudes of the associated stresses of each individuum of the triplet on the direction of propagation is determined in terms of the ratios of the elastic parameters of the particular crystalline medium, said analytical connections having first been derived more than one hundred years ago and being known to those skilled in the art.

Even in the most general type of aeolotropic medium, i. e., one belonging to the triclinic crystallographic system, there will be certain directions of propagation in which simpler conditions prevail, such as pure transversality of motion for one or two individua of the associated triplets and/or absence of some stress components in some of the individua. Three such mutually independent simplifications though not in all possible combinations can in general be realized for special propagation directions, in view of the fact that the elastic parameters depend on the angles of orientation and that an orthogonal transformation contains three independent parameters (Eulerian angles). However, three conditions alone are not, from the point of the objects of this invention, sufficient to produce any intrinsic simplification of a wave triplet, which therefore can be secured only by additional conditions based on crystallographic symmetry. The truth of this statement will be understood upon proceeding from infinitely extended to bounded media, i. e., to standing plane waves.

Standing plane waves are obtained from propagating ones by the introduction of one or two plane boundaries perpendicular to the direction of propagation, proceeding from the omnilaterally infinitely extended medium to a semi-omnilaterally or a bilaterally extended one; the latter case represents a disc or infinite plate. The reflections producing standing wave patterns are governed by the mechanical impedance matrix depending on the ratios between the elastic constants and the mass densities of the two media forming the plane boundary; this involves two sets of three linear relations each between the three components of displacement and the three boundary stress components, one normal and two shear stresses, which make up the traction per unit area of the plane boundary. These three stress components will be referred to as "boundary stresses," the remaining three as "latent stresses" associated with a particular direction of propagation or boundary normal.

Only the special case where the two adjoining media are isotropic and identical is of interest in connection with the present objects.

It is evident that single simplifications of propagating wave triplets pointed out previously, as are produced by special orientation, such as association of a wave individuum solely with one shear strain component or, in a different case, with one shear boundary stress component only, are in general lost upon reflection, i. e., in the case of standing waves, due to the boundary stress-strain interactions. However, it can easily be shown that if the relationships between the elastic cofficients are such that for the direction considered there exists a wave which is both transversal in motion and also contains the shearing stress corresponding to the associated shear strain as sole boundary stress component, then it will also exist as a standing wave in a disc between isotropic media. Such a wave is called a shear wave.

In the practical cases of main importance for this invention, the magnitudes of mass density and the stiffness coefficients of the adjoining medium are negligibly small compared to those of the crystalline disc; this is true for a piezoelectric resonator in a gas of atmospheric or reduced pressure. Then the boundary conditions are substantially those of complete motional freedom, implying the vanishing of all three boundary stress components. Disregarding dissipative losses, free standing shear waves or vibrations can then exist for the frequency phase velocity of the shear wave considered double disc thickness and for its integral multiples, i. e., for the natural frequencies of the (thickness controlled) shear mode considered; shearing stress and strain as well as transversal displacement are sinusoidally distributed across the thickness over $n$ half sine waves ($n$-order), the former having nodes, the latter antinodes at the boundaries.

Special relationships existing between the elastic constants of a crystal may be such that, for particular directions, one wave is purely longitudinal and therefore the other two purely transversal; if, in addition, the former is associated with normal boundary stress (and latent stresses) only, it follows at once from the previously quoted theory that the other two are both shear waves, and this state of affairs is evidently maintained in case of standing waves between isotropics. Whereas in the previous case of a single shear mode the other two modes are in general of mixed character, i. e., have boundary stress components in common, interacting along an isotropic boundary, and therefore do not have harmonic series of natural frequencies, we are dealing here with three sets of standing plane waves free from mutual interaction along the boundary and herefore each having a harmonic spectrum. Inasmuch as for reasons to become apparent soon the objects of this invention concern shear vibrations only, this case will be characterized by the notation "double-series" shear vibrations and the previous one, correspondingly, by "single-series" shear vibrations.

Infinite aeolotropic (single- and double-series) shear discs, to which discussion has led so far, are closely related to finite aeolotropic shear discs which are tied up with the objects of this invention. However, finiteness of the lateral dimensions does, in general, upset the state of non-interaction between a (thickness-controlled) shear vibration and other vibrational modes and thus the former's shear purity and the harmonicity of its resonance spectrum. This is due to two kinds of disturbing influences of relatively major and minor importance, both well known to the art. Both give rise to the phenomenon of "parasitic vibrations," which are secondary resonances whose frequencies are densely located about those of desired thickness controlled shear modes and which have such undesirable effects as frequency jumps due to slight temperature fluctuations or tube or circuit changes in case of piezoelectric oscillators and highly irregular impedance vs. frequency in case of piezoelectric filter elements.

These phenomena have been the source of a major difficulty that has confronted the practical use of thickness-controlled piezo-elements ever since the inception of the art. In case of quartz, they have been successfully dealt with only at a relatively late date. Their elimination is one of the fundamental objects of this invention. In case of quartz, this is possible to a limited degree, but involves certain complications due to the particular type of crystallographic symmetry of the class D₃. One of my objects is to specify other crystal classes and cuts therein which in these and other respects have superior properties. In order to lead up to this, a review of the phenomenon of parasitic vibrations in form of a qualitative analysis is indicated.

The major cause of this effect is connected with the latent stresses which, as pointed out, are in general associated with a shear wave besides its boundary shear stress, viz., the two transversal normal stress components and the shear stress in the phase plane or "face shear." A plate of finite lateral dimensions has transversal vibrational modes of (predominantly) extensional and face shear character whose gravest natural frequencies are essentially determined by those dimensions and which involve essentially those three stress components. Interaction by elastic linkage is thus established between the desired thickness mode and those lateral-controlled modes. Bearing in mind that the lateral dimensions of practical piezo-vibrator plates though finite are large compared to the thickness, and remembering that the gravest natural frequency of a mode is inversely proportional to the controlling dimension or to a first order homogeneous function of the controlling dimensions, it is clear that the gravest resonances of the lateral-controlled modes will be much lower than those of thickness-controlled shear mode(s).

It is known from the theory of the asymptotic distribution of eigen-values of the boundary value problems of linear mathematical physics (e. g., R. Courant and D. Hilbert: Methoden der Mathematischen Physik, vol. I, 2nd edition, chap. V. § 11, Springer, Berlin, 1931; M. J. O. Strutt: Mathematische Annalen, vol. 102, No. 5, 671–684, 1930) that the densities of the natural frequencies ("overtones") of continuous dissipation-free dynamical systems increase rapidly appreciably above the region of the gravest frequencies, viz., with a high power of frequency, which power increases linearly with the rank of the associated tensor (here: four) and the number of dimensions (here: two lateral dimensions). In the region of the gravest thickness-controlled shear resonance, the frequency scale will therefore be covered fairly densely with resonances of lateral-controlled modes so that in general one or several of them will be in the close neighborhood of the former. As pointed out, the latent stress components common to both types of modes establish elastic interaction between them. True, the associated interaction factors will be small in view of the fact that the vibrational patterns of lateral overtones are cut up into islands of opposite phases by nodal lines of numbers and shapes according to the orders of the overtones, and that therefore most of the partial interactions between lateral overtone and thickness-fundamental associated with those islands partially cancel. Now, it is known that the introduction of reactive interaction between two originally interaction-free vibrational modes will appreciably shift the associated natural frequencies, i. e., will be physically apparent only if the interaction factor is at least of the order of magnitude of the relative separation of the undisturbed frequencies, the interaction effect being one of mutual "repulsion" of the frequencies and its order of magnitude, that of the interaction factor; the square of the interaction factor is defined as the ratio of the mutual energy to the geometrical means of the self-energies of the two modes (in the present case of elastic interaction, of the elastic energies). Parasitic vibrations as referred to previously appear thus as a consequence of elastic interaction via the latent stress components in combination with the high frequency density of the lateral-controlled overtones: a thickness-controlled shear mode resonance and, in particular, the gravest one, is split up into two or several secondary resonances, i. e., is no longer strictly thickness controlled, but secondarily also lateral-controlled. Inasmuch as the overtone density increases asymptotically much more rapidly with frequency than the interaction factors decrease, we come to the seemingly absurd conclusion that while pure thickness-controlled shear vibrations are possible for infinite discs, gradual increase of the lateral dimensions would steadily increase the split-up into parasitics. This difficulty, however, is a purely mathematical one and as such well known as a generalized Gibb's phenomenon; the associated physical phenomenon does not exist due to the omnipresence of dissipation. It can be shown that interaction between modes becomes negligible as soon as the interaction factor becomes appreciably smaller than the loss factor (inverse of the "magnification" Q). Therefore the dynamical status of the infinite disc is practically attained for large, but finite, ratios of lateral-to-thickness dimensions. Notwithstanding this, elastic thickness-lateral interaction is an effect of very practical importance because the mechanical loss factors of thickness-controlled crystal vibrators are generally very small (internally of the orders $10^{-3}$ to $10^{-7}$, externally $10^{-3}$ to $10^{-5}$); interaction is thus not in general eliminated by dissipation for plates with conventional thickness-to-lateral ratios as dictated by practical considerations, except for the higher thickness-harmonics, the effective thickness being the half wavelength or the physical thickness ÷ order of harmonic. The practical use of thickness vibrations in high-order harmonics is, however, restricted due to reasons associated with the conventional electrical oscillator circuits to be pointed out later on.

The deleterious effects of parasitic vibrations have been partly pointed out above and include frequency jumps in oscillators due to slight changes of environment such as ambient temperature, electrical operating conditions, lowering of piezoelectric activity; lack of accurate predictability and unharmonicity of the high frequency spectrum; upsetting of desired filter characteristics. Other related effects and the seriousness of those enumerated are well understood and appreciated by those skilled in the art.

It should be emphasized that the recognition of the association of shear waves with latent stress components as the major cause of parasitic phenomena via elastic interaction is not, by itself, new to the art. Now mathematical investigation shows that if certain relations between the elastic coefficients of the medium are fulfilled, single-series or double-series shear waves for certain directions of propagation will be associated exclusively with boundary shear stress components and not with latent stresses. In these cases elastic interaction with lateral modes in finite discs of the orientations considered is absent. It will be appreciated that this state of affairs can never be expected for the longitudinal component in the case of double-series shear waves because the vanishing of both elastic cross factors (Poisson ratios) linking it with the lateral normal stresses is physically so extremely improbable that for practical purposes it may be called impossible. This is the reason why the objects of this invention do not embrace longitudinal thickness modes.

The existence of single- and double-series shear waves associated with boundary shear stress only would thus lead to finite discs of corresponding orientation permitting thickness-controlled shear vibrations free from elastic interaction with other modes; such shear waves will accordingly be called "pure (thickness-controlled single- or double-series) shear waves" and the associated vibrations, "pure (thickness-controlled single- or double-series) shear vibrations." They are closely related to the objects of this invention.

Mathematical investigation of symmetrical tensors of rank four under orthogonal transformations shows that simultaneous disappearance of all elastic cross factors linked with an elastic shear parameter implies stationarity of the latter. This signalizes an important positive practical advantage associated with pure shear plates besides the negative one of eliminating parasitic resonances produced by elastic interaction: it means that the associated shear frequency constants are also stationary (maxima, minima or saddle points) for these orientations, i. e., depend only quadratically (or, in special cases, possibly in higher order) on small angular deviations from these preferred cuts. This is also true for the tendency to parasitic resonances as the latter depends on the square of the elastic interaction factors which go through zero for these orientations. Thus a pure shear cut has the desirable property of least all-round sensitivity to small angular errors. Elimination of elastic interaction thus holding substantially throughout a certain neighborhood of a pure shear cut, moderate angular deviations from it can not only be tolerated, but may, in some cases, even be desirable if they lead to the improvement, from the point of application, of certain other physical properties, for instance, temperature coefficients. These conditions are of significance for the objects of this invention. As an example, the case of quartz shall be cited which is related to, but not encompassed by, the present invention. There is a class of crystallographically equivalent pure shear cuts in quartz called by their discoverers AC and BC cuts (see F. R. Lack, G. W. Willard and I. E. Fair, Bell System Technical Journal XIII, 433–463, July, 1939; U. S. Pat. 2,173,589 by W. P. Mason and R. A. Sykes, and W. P. Mason, Bell System Technical Journal XIX, 74–93, January, 1940). It will become apparent later on in this description that these are special instances of conditions of crystallographic symmetry prevailing in the trigonal system and fundamentally based on the lowest form of crystallographic symmetry as realized in the monoclinic system. By a lucky freak of nature, the temperature coefficients of the frequency constants of those cuts are, in the case of quartz, very small, and orientations of zero temperature coefficient at room temperature, called AT and BT cuts, are only a few degrees distant. The latter cuts enjoy absence of parasitics caused by elastic interaction almost as fully as the AC and BC cuts.

It should, however, not be inferred that absence of all associated elastic cross factors is a necessary condition for the stationarity of a shear modulus. Investigation shows that the latter requires only three homogeneous relationships between the elastic constants and does therefore not necessarily call for any crystallographic symmetry property.

The existence of a second and lesser cause of parasitic vibrations in thickness controlled shear plates has been referred to previously. As distinct from the elastic interaction dealt with so far, this effect is due to inertia interaction between the desired shear mode and vibrations of the flexural type along the free lateral boundary. The inertia coupling is associated with the longitudinal component of motion impossible in an infinite disc in shear vibration, but engendered along the rim of a finite plate by the condition of motional freedom along the boundary which implies absence of force couples and thus irrotational motion. Inasmuch as this effect has been dealt with in both patent and scientific literature (e. g., U. S. patent quoted and H. J. McSkimin, Bell System Technical Journal XXIII, 151–177, April, 1944), I mention merely two points: First, the inertia interaction effect is in general much weaker and therefore less troublesome than elastic interaction, particularly for relatively thin plates, because of the much lower fundamental frequencies of flexural vibrations implying higher frequency densities in the region of the desired thickness-controlled resonance and therefore a tendency to obliteration by dissipation as pointed out previously, and because the interaction is essentially confined to a region along the rim, while elastic interaction is a volume effect. Second, means are known to substantially suppress or reduce longitudinal edge motion and thus inertia coupling by suitable crystal holder design (U. S. patent quoted).

So far the aspect has been that of elastic plane waves and vibrations. More specifically, objects of this invention are piezoelectric vibrator discs which are thickness-controlled single- or double-series pure shear vibrators and in which there exists piezoelectric interaction between one or both shear modes, on the one hand, and the longitudinal component of electric field and dielectric displacement, on the other hand. Granted this piezoelectric interaction, the wave velocities and therefore the harmonic series of resonances of plated piezoelectric thickness-controlled shear discs must also depend on the reactance of the electric circuit connected thereto. This piezoelectric interaction being a significiant aspect of my invention, an extension of some of the preceding explanations is indicated in order to include this aspect as well for the sake of clear differentiation of this invention from related claims already presented by others.

A general elasto-dielectric continuum, called "piezoelectricum," is quantitatively described by three sets of parameters: the elastic, dielectric and piezoelectric ones. The latter represent the linear interactions between elastic stress and strain components on the one hand, and electric field and dielectric displacement components on the other hand, similarly as the first set describes the linear interactions between stress and strain components and the second set describes those between the components of electric field and dielectric displacement. It is thus evident that, just as a particular elastic coefficient connecting a stress and a strain component, e. g., a Young's modulus, say, will in general depend on the external connections between the other five stress-strain pairs, e. g., on whether the material is transversally free or blocked, say, it will in general also depend on the electrical conditions, e. g., on whether certain field components are zero (short circuit) or the corresponding displacement components are zero (open circuit).

In the case of plane wave propagation in an omnilaterally infinitely extended piezoelectricum, the electrical conditions are well defined: As the order of magnitude of the elastic wave propagation velocities is negligibly small compared to the speed of light, the electromagnetic aspect may be disregarded and purely electrostatic treatment is adequate; this requires the electric field vector to be irrotational and the dielectric displacement vector to be source-free inasmuch as there are no free electric currents or charges inside the continuum. In case of plane waves, therefore, the two transversal field components and the longitudinal displacement components must be zero.[1] With this stipulation, then, the analysis and the results of elastic plane wave propagation as discussed previously hold in their totality for piezoelectrica.

For a finite plated disc, however, the condition of zero longitudinal dielectric displacement is fulfilled only in case of electrical open circuit[2] or, in practice, if the impedance of the electrical circuit to which it is connected is large compared

---

[1] More accurately, they must be independent of the spatial location. But as a superimposed field or displacement which is the same everywhere and depends on time only (the speed of light being considered as infinite for the present purpose; see text above) represents a stationary state and is not connected with wave propagation, it has no bearing on the subject and is therefore omitted.

[2] The bulging of the field lines at the rim and the stray field through air are neglected, i. e., the field is considered homogeneous. This approximation is well permissible in view of the small thickness+lateral ratio and of the fact that the relative dielectric constants of most crystals are appreciably larger than one.

to its internal impedance. The latter is, at open-circuit mechanical resonance, approximately $$\frac{8}{\pi^2}\kappa^2\frac{Q_m}{\omega C}$$

where C—static capacity, $\omega=2\pi\times$resonance frequency, $Q_m$—the reciprocal of the mechanical dissipation factor and $\kappa$—the piezoelectric interaction or coupling factor ("activity") of the high frequency shear mode. In view of the large magnitude of $Q_m$, this represents, in general, a considerably higher impedance than that of conventional circuits even when they antiresonate. Thus, the condition of zero longitudinal electric displacement which obtains in the infinite piezoelectricum can hardly ever be fulfilled even approximately for a thickness-controlled plate in a conventional electrical circuit.

If a piezoelectric thickness-controlled shear disc with the longitudinal component of dielectric displacement as piezo-active component is considered from the electrical side, a vibrational resonance frequency in terms of standing waves represents thus an electrical antiresonance frequency or impedance infinity (impedance maximum in presence of dissipation). According to the well-known reactance theorem (R. M. Foster, Bell System Technical Journal III, 259–267, 1924), this is accompanied by a somewhat lower electrical resonance frequency where the impedance is zero (minimal); this frequency can also be considered as vibrational resonance for electrical short circuit. An electrical antiresonance frequency is denoted by $$f_a=\frac{\omega_a}{2\pi}$$

and the associated resonance frequency, by $$f_r=\frac{\omega_r}{2\pi}$$

their relative separation $$\frac{f_a-f_r}{f_a}$$

by $\eta_r$ and, more generally, the separation of an arbitrary frequency $f$ by $$\eta=\frac{f_a-f}{f_a}$$

A relative resonance frequency $\eta_r$ depends only on the piezoelectric interaction factor $\kappa$ associated with the particular thickness-controlled vibrational mode considered, by the relation $$\kappa^2=\frac{\pi}{2}(1-\eta_r)\tan\frac{\pi}{2}\eta_r\doteq\left(\frac{\pi}{2}\right)^2\eta_r(1-\eta_r)$$

The approximation is usually permissible inasmuch as in most instances $$\eta^2_r\ll 1$$

A relatively small frequency band containing $f_r$ and $f_a$, for which band still $\eta^2\ll 1$, contains most of the interesting and useful features as far as the associated electrical impedance is concerned, inasmuch as appreciably outside this band such a plate represents substantially a "dead" static capacity $C_s$ (i. e., in absence of parasitic split up). In such a band, the electrical impedance Z is given by the approximate formula $$Z=\frac{1+\left(\frac{\pi^2}{4}-1\right)\eta_r}{iC_s\omega}\cdot\frac{(\eta+\eta_r)-i\left(\frac{1}{2}\delta_m-\delta_e\eta\right)}{\eta-\frac{i}{2}\delta_m}$$

$$\eta^2_r,\eta^2,\frac{\delta^2_m}{\eta_r}$$

and $$\eta_r.\delta_e\ll 1,$$

where $$\delta_m=Q^{-1}_m$$

denotes the mechanical loss factor and $\delta_e$—the dielectric loss factor. The reactive part of Z is negative (capacitive) except for $-\eta_r<\eta<0$, i. e., between $f_r$ and $f_a$, where it is inductive.

The conventional oscillator circuits in which piezoelectric crystals are used, fall broadly in two groups: the "high impedance" types whose use is most widespread and for which the Pierce circuits are prototypes, and the "low impedance" or "resonance" types mostly associated with bridge arrangements like the Meacham circuit (e. g., L. A. Meacham, Pros. Inst. Rad. Eng. XXVI, 1278–1294, October, 1938; Bell System Technical Journal XVII, 574–591, October, 1938) as characteristic representative. In the first case, the crystal is operated in the inductive range between $f_r$ and $f_a$, the exact location of the oscillator frequency depending to some degree on the other circuit elements including the tube, in the second case, at the resonance frequency, which latter operation gives the oscillator much higher stability, particularly in conjunction with a self-stabilizing bridge arrangement, and also permits operation at high-order overtones, owing to the neutralization of the "dead" crystal capacity in the bridge. Conventional Pierce-type circuits, on the other hand, do therefore not oscillate at higher overtones, which, as pointed out previously, adds to the seriousness of the problem of parasitic resonances.

In the application to wave filters, on the other hand, crystals are employed over and somewhat beyond the whole range between $f_r$ and $f_a$ if used without coils, and over bands of much larger width, i. e., of the order $\kappa$, when used in conjunction with coils (e. g., W. P. Mason, Bell System Technical Journal XIII, 405, July, 1934 and XVI, 423, October, 1937).

As pointed out, the elastic constants of a piezoelectricum depend on the electrical conditions. Thus in view of the fact that in practical operation these are in general not constant, as shown, the orientations where pure shear vibration obtain will, in general, depend on the impedances of the associated circuits. This includes the effect of air gaps. It appears that this fact has not received much attention heretofore because this dependence is small for most quartz cuts, due to the low piezoelectric coupling coefficients ("piezoelectric activity") of that substance. The influence under consideration is, however, by no means negligible in case of higher piezoelectric activities.

Similar disturbing influences are associated with the dependence of the elastic parameters on other physical quantities, e. g., temperature, which thereby exert an influence on the directions of pure shear waves. While, for instance, in case of quartz, the influence of temperature on the orientation of certain zero temperature-coefficient cuts has received much emphasis, the corresponding influence on the orientation of elastic decoupling has not.

In a case of pure shear excitation, the longitudinal electric component may, in addition to one or both high frequency shear modes, be coupled with other types of modes even though direct elastic interaction between the two groups is absent. This may either happen via direct piezoelectric and dielectric-piezoelectric interaction or indirectly due to the conditions at the lateral boundary; while, in an infinitely extended plate, the transversal field components vanish, the contour of a finite plate is electrically insulated, i. e., there the transversal component of dielectric displacement normal to the periphery must vanish; the non-homogeneity in the rim region thus created couples longitudinal with transversal electrical components, and the latter may interact piezoelectrically with unwanted vibrational modes. The practical nuisance value of this effect, i. e., as a source of parasitic resonances is very small and may usually be ignored on similar, but still more potent grounds as were previously mentioned in connection with the contourial inertia interaction. Direct piezoelectric interactions of the longitudinal electric component with unwanted vibrational modes or dielectric interactions of the electrical longitudinal component with transversal components and piezoelectric interaction of the latter with those unwanted modes, which two ways of interaction have the same effect, while generally weaker and less insidious than corresponding elastic interactions, can, however, not be similarly dismissed. The interactions may involve the three mutually interacting normal stress-strain components or the face shear component or both. For the reasons pointed out previously, the first and last eventualities are liable to cause appreciable parasitic trouble; the second one, however, involving one type of mode (dimension) only and at that the one with the highest elastic compliance, i. e., lowest fundamental frequency, is apt to introduce disturbances only if the ratios of the lateral dimensions to thickness are chosen particularly unfortunately and/or if the undesired piezoelectric interaction factor is large relative to the desired one.

On the basis of the preceeding explanations, it will be appreciated that for most practical applications the advantages inherent in thickness-controlled pure shear operation are in the general case seriously marred by the attendant difficulties discussed, i. e., piezoelectric coupling of the longitudinal electric component with normal elastic components and dependence of the pure shear orientations on the electrical and on ambient physical conditions. Another practical difficulty is due to the fact that in general these preferred orientations depend on the ratios of the elastic constants of a particular material considered, which ratios are different for different substances even of the same crystal class. The preferred orientations must therefore, in such cases, be found out by careful and difficult measurements, and the crystal plates have to be cut under odd angles to the crystallographic axes.

It has been recognized by me that all these difficulties resolve themselves in those cases where the directions of pure (single or double)-series shear propagation are directions distinguished by virtue of crystallographic symmetry and thus do not depend on the particular constants of a given material. Inasmuch as then the preferred orientations are no longer dependent on the electrical and ambient conditions and (as will be shown later) do not in general admit piezoelectric interaction with normal elastic components, they shall be referred to in the following as "unconditionally pure (single- or double-series) shear waves or vibrations," as distinct from the cases where the preferred directions involve ratios of elastic parameters, which are called "conditionally pure (single- or double-series) shear waves or vibrations." While the mathematical conditions for the existence of pure shear waves in general have been known for some time, it is believed that the conditions for the existence of unconditionally pure shear vibrations and the attendant simple rules for determining them have not been found previously; also, that it has been recognized for the first time that these conditions are only slightly more restrictive from the point of selection among the variety of crystal classes than the former and that, in contradistinction to the former, they admit simple physical interpretation, in particular, that they are predicated on the existence of (at least) one even-rank plane of symmetry (or digonal axis) as necessary, if not sufficient, condition, the definition and significance of this term to be given later on; it has also been recognized here that unconditionally pure shear waves comprise all crystal classes permitting pure shear wave excitation in general, with only three exceptions, viz., the monoclinic polar class and the two monocyclic piezoelectric classes of the trigonal system, to one of which quartz belongs; finally, I have recognized the existence, for certain types of crystallographic symmetry, of "degenerate" unconditionally pure shear cuts, in which the relevant elastic, piezoelectric and dielectric properties of the crystal plate are entirely independent of the azimuthal angle of orientation; this represents an appreciable practical advantage concerning ease of cutting and avoidance of waste of the crystalline material inasmuch as the only orientational condition is that the plate faces contain the major crystallographic axis.

Various advantages of the operation of piezoelectric crystal plates in unconditionally pure (single- or double-series) thickness-controlled shear vibration over other types of piezo-vibrators for the control of, or as impedance elements at, elevated radio frequencies have been explained in the preceding part, and those advantages as well as related ones not explicitly stated here are known to those skilled in the art. It is believed that the idea and realization of unconditionally pure thickness-controlled shear plates has not been disclosed previously.

It has been pointed out that the class of unconditionally pure shear cuts has not only a number of significant practical advantages not possessed by the wider class of pure shear cuts in general, but also that, in contradistinction to the latter, it admits direct crystallographic interpretation. It is thus arrived at by visualization rather than by purely formal analysis which, though a convenient means of verifying the results, does not imply the concept of unconditionality.

My invention is based on certain physical and crystallographic concepts, partly well known, partly introduced here. Their quantitative description requires mathematical notations. What follows immediately is therefore concerned with explanations and definitions of notations and concepts as a necessary preparation for the derivative description of the invention itself.

Right-handed Cartesian systems with coordinates $x$, $y$, $z$, and axes (X, Y, Z) will be used. When applied to crystals the Z-axis will always be assumed to coincide with the direction associated with the primary element of crystallographic symmetry, in case such a direction exists, the X- and thus Y-axes, with those of subsidiary symmetry, if existing; in case the former exist, but not the latter, the axes will be called $\overline{X}$ and $\overline{Y}$; in the cubic system where the three crystallographic axes are of equal status, they are called: $X_i$, $i=1, 2, 3$. A new coordinate system obtained by rotation about the Z-axis is denoted by (X', Y', Z), the angle of rotation (azimuth), by $\varphi$; in case of rotation about the X-axis: (X, Y', Z'), the angle: $v$. In case of subsequent rotations, the result of two operations is doubly primed; e. g., $$(XYZ) \xrightarrow{(\varphi)} (X'Y'Z') \xrightarrow{(v)} (X'Y''Z')$$

The particular orientations admitting pure shear waves are denoted by $\varphi_0$, $v_0$, and the associated axes positions as far as different from crystal axes will also receive the subscript 0. A system of arbitrary orientation with respect to crystal axes is denoted with all axes and coordinates primed: (X', Y', Z'); $x'$, $y'$, $z'$. In this case, the $z'$-direction is always identified with the normal of the plane wave considered.

The three components of (mechanical) displacement in the system (X'Y'Z') are called $u'_1$, $u'_2$, $u'_3$; those of the electric field vector $\overline{E}$: $E'_1$, $E'_2$, $E'_3$; those of the electric displacement vector $\overline{D}$: $D'_1$, $D'_2$, $D'_3$; the three normal components of the stress tensor:

$$\sigma'_{xx} \equiv \sigma'_1, \quad \sigma'_{yy} \equiv \sigma'_2, \quad \sigma'_{zz} \equiv \sigma'_3$$

the three shear components:

$$\sigma'_{yz} = \sigma'_{zy} \equiv \sigma'_4, \quad \sigma'_{zx} = \sigma'_{xz} \equiv \sigma'_5, \quad \sigma'_{xy} = \sigma'_{yx} \equiv \sigma'_6$$

the corresponding symmetrical strain components: $\eta'_1, \ldots, \eta'_6$. The letters ($i$, $k$, $l$) denote the respective subscripts (1, 2, 3) in cyclical order; ($\alpha$, $\beta$, $\gamma$), those (4, 5, 6); in this way, $i$ and $\alpha$ etc., correspond to each other. Finally $p$, $q$, ... denote all the subscripts 1, 2 ... 6.

The (partial) elastic stiffness coefficient $c'_{ik}=c'_{ki}$ is defined in terms of the free energy F per unit volume of the piezoelectricum by $$\frac{\delta^2 F}{\delta \eta'_i \delta \eta'_k}$$

or in terms of stress, by $$\frac{\delta \sigma'_i}{\delta \eta'_k} = \frac{\delta \sigma'_k}{\delta \eta'_i}$$

similarly for ($\alpha$, $\beta$, $\gamma$). This definition is meaningless as long as the other five elastic and the three dielectric component pairs are unspecified. As customary, the notation $c'$ will imply elastic immobility, viz., $$c'_{ik} = \left(\frac{\delta \sigma'_i}{\delta \eta'_k}\right)_{\eta'_i = \eta'_l = \eta'_\alpha = \eta'_\beta = \eta'_\gamma = 0} \quad ^1$$

[1] Actually, this should read $\eta'_l = \ldots = \eta'_\gamma = \text{const.}$ We shall, however, disregard a stationary elastic state, as not pertinent to the dynamic phenomena considered, just as previously a stationary electrostatic field was dismissed.

or abbreviated:

$$c'_{ik} = \left(\frac{\delta \sigma'_i}{\delta \eta'_k}\right)_{\eta'_i, \eta'_l, \eta'_\alpha, \eta'_\beta, \eta'_\gamma}$$

also, electrical open circuit: $\overline{D}=0$. $c'$ will also be used in absence of piezoelectric interaction. In cases where this is present, but the electrical conditions are otherwise, the unvaried electrical components are indicated, e. g.:

$$(c'_{ik})_{E'_i, D'_k, E'_l}$$

In particular, the case of plane wave propagation for which $E'_l=E'_k=0$, $D'_l=0$, will be denoted by $\overset{\smile}{c}'$, that of complete electrical short-circuit, by $c^{*'}$. However, in the later part of this description where these stiffness coefficients are used continually the curved bar or asterisk, respectively, will be dropped for the sake of simplicity. A similar qualification concerning the piezoelectric stiffness coefficients will be stated at the end.

The more commonly used corresponding system of compliance coefficients whose electrical component is represented by the partial dielectric constants is less adapted for the present purpose; the dielectric coefficients used here are therefore those of dielectric stiffness:

$$\beta'_{ki} = \beta'_{ik} = \frac{\delta^2 F}{\delta D'_i \delta D'_k} = \frac{\delta E'_i}{\delta D'_k}\bigg|_{D'_j, D'_l, \eta'}$$

Similarly, the piezoelectric stiffness coefficients $$h'_{ik} = \frac{\delta^2 F}{\delta D'_i \delta \eta'_k}$$

are used;

$$h'_{i\alpha} = \frac{\delta^2 F}{\delta D'_i \delta \eta'_\alpha}, \quad h'_{ik} \neq h'_{ki}$$

or $$h'_{i\alpha} = \left(\frac{\delta E'_i}{\delta \eta'_\alpha}\right)_{\eta'_i, \eta'_k, \eta'_l, \eta'_\beta, \eta'_\gamma, D'_k, D'_l} = \left(\frac{\delta \sigma'_\alpha}{\delta D'_i}\right) \text{same}$$

The dynamical theory of piezoelectric continua shows that the conditions for the existence of one (motionally) transversal wave in the direction $z'$ are: $\overset{\smile}{c}'_{34}=\overset{\smile}{c}'_{45}=0$ or $\overset{\smile}{c}'_{35}=\overset{\smile}{c}'_{45}=0$, the associated displacement being in the first case $u'_2$, in the second, $u'_1$. Similarly, the condition for the existence of a (motionally) longitudinal wave is: $\overset{\smile}{c}'_{34}=\overset{\smile}{c}'_{35}=0$. In this case, the other two waves of the triplet are motionally transversal; their displacements $u''_1$ and $u''_2$ are found by a rotation about the $z'$-axis which will make $\overset{\smile}{c}''_{45}=0$ (and obviously does not invalidate the former condition). When including this rotation in a general orthogonal transformation which rotates the coordinate system from an arbitrary orientation so that the $z'$-axis coincides with the direction of propagation and the $x'$ and $y'$ axes with those of the transversal displacements associated with the two shear waves of the triplet, the three conditions $\overset{\smile}{c}'_{34}=\overset{\smile}{c}'_{35}=\overset{\smile}{c}'_{45}=0$ are fulfilled. The $\overset{\smile}{c}'_{i\alpha}$ are, according to well known transformation formulae, linear functions of the original set ($c$, $h$, $\beta$) with coefficients depending on the transformation constants. Any rotation being characterized by three independent parameters, e. g., the three Eulerian angles, it follows that these conditions represent three equations with three unknowns. As these equations are transcendental there may exist infinitely many, but only discrete directions for which double-series shear wave propagation obtains. Most (or sometimes even all) of these solutions may be complex, depending on the numerical ratios of the stiffness coefficients, and thus do not represent physical directions. The case of the single transversal wave, on the other hand, is predicated on only two conditions and may thus be fulfilled in directions forming discrete curves as intersections with the unit sphere. As indicated previously, it is thus seen that up to three single simplifications such as motional transversality can be obtained without any requirement of crystallographic symmetry, inasmuch as no special assumptions have been made regarding the set of stiffness parameters.

As far as the numerical values of these forty-five parameters, i. e., twenty-one $c$-coefficients, eighteen $h$-coefficients and six $\beta$-coefficients are concerned, they are, in the general case, subject only to the condition that the quadratic form $$\frac{1}{2}\left[\sum_{p=1}^{6}\sum_{q=1}^{6}c_{pq}\eta_p\eta_q+2\sum_{p=1}^{6}\sum_{k=1}^{3}h_{kp}D_k\eta_k+\sum_{i=1}^{3}\sum_{k=1}^{3}\beta_{ik}D_iD_k\right]: c_{pq}=c_{qp},\ \beta_{ik}=\beta_{ki}$$

which represents the contribution of the phenomena considered to the free energy per volume unit, is positive definite; thus all diagonal ("self") elements and principal minors are positive (in particular, all interaction factors are absolutely >1). Any additional restrictions can only be consequences of crystallographic symmetry.

Proceeding from these general conditions to pure shear waves as defined previously, a fact basic to the invention will emerge. It follows directly from the definition of the pure shear wave that its existence is predicated on five conditions of the form:

$\bar{c}_{pa}=0$ or $c^*{}'_{pa}=0$; $p\neq a$, for open- or short-circuit operation, respectively. This has been recognized previously (Mason and Sykes, l. c., and Mason, l. c.). Now, on the one hand, pure shear waves are evidently not possible in the most general crystals, i. e., the triclinic or asymmetric system, as a rotation involves only three disposable constants. On the other hand, the above five conditions do not, as will be shown presently, correspond to any element or combination of elements of crystallographic symmetry nor even to any elements of symmetry limited to the elastic properties alone. Therefore, any type of crystallographic or limited symmetry which satisfies those five conditions for certain orientations, fulfills simultaneously additional conditions. In the majority of cases, this total set of conditions realizes unconditionally pure shear waves. In particular, it has been recognized here that with one exception which is realized in three classes, one of them that of quartz, all those pure shear waves permissible by virtue of the lowest (fundamental) element of symmetry, which are piezoelectrically active, are unconditionally pure. The detailed consequences of this recognition leading to the specification for all unconditionally pure shear cuts possible in nature form the core of the present invention.

Some explanations concerning the effects of the different elements of crystallographic symmetry upon the elastic, piezoelectric and dielectric properties are in order, before taking up that final phase.

In the standard Schoenfliess system of crystal classification, $n$-fold rotation axes ($n=2, 3, 4, 6$), $2m$-fold mirror axes ($m=1, 2, 3$) and mirror planes are considered as fundamental elements of crystallographic symmetry. Certain combinations of them imply other (derived) elements of symmetry, viz., $2m$-fold rotation-inversion axes or a center of symmetry. The symbols of the various crystal classes consist of a capital letter with a subscript indicating the nature and multiplicity of the primary element of symmetry, e. g., $C_4$ for a fourfold rotation axis, $S_6$ for a sixfold mirror axis, $C_s$ for a mirror plane, and a further subscript indicating the additional (subsidiary) elements, e. g., $v$ and $h$ for a vertical and horizontal mirror plane, respectively, the symmetry axis always being considered vertical (Z-axis). It turns out that when the three above mentioned types of elements are considered as fundamental, some crystal classes obtain symbols in which the number 3 appears thus classifying them as trigonal, while according to their space group, they are actually hexagonal, and vice versa. This difficulty is avoided by considering rotation-inversion axes as basic elements instead of mirror axes, which is also in agreement with the basis of the international symbols. Schoenfliess-type crystal class symbols adapted to this choice will be used here with the original Schoenfliess symbols sometimes added in parenthesis; suitable class names corresponding to this choice and partly following the nomenclature of Miers-Phillips (see W. P. Davey: "A Study of Crystal Structure and its Applications," McGraw-Hill, 1934, pp. 218–221) are used here instead of the morphological terms. The resulting table of crystal classes is shown as Table I.

Table I.—*Table of crystal glasses*

|  | Triclinic | Monoclinic (M) and Orthorhombic (O) | Tetragonal | Hexagonal | Trigonal | Cubic |
|---|---|---|---|---|---|---|
| Monocyclic: |  |  |  |  |  |  |
| Polar | ($C_1$) | $C_2$ (M) | $C_4$ | $C_6$ | $C_3$ | T |
| Inverse |  | $I_2(=C_s)$ (M) | $I_4(=S_4)$ | $I_6(=C_{3h})$ |  |  |
| Holoaxial |  | $D_2=V$ (O) | $D_4$ | $D_6$ | $D_3$ | $T_f=O$ |
| Central | $C_{1i}(=S_2)$ | $C_{2h}=C_{2i}$ (M) | $C_{4h}=C_{4i}$ | $C_{6h}=C_{6i}$ | $C_{3i}(=S_6)$ | $T_h=T_i$ |
| Dicyclic: |  |  |  |  |  |  |
| Polar |  |  | $C_{4v}$ | $C_{6v}$ | $C_{3v}$ | $T_d$ |
| Inverse |  |  | $I_{4v}=V_d$ [1] | $I_{6v}(=D_{3h})$ |  |  |
| Central (Holoedral) |  | $V_h=V_i$ (O) | $D_{4h}=D_{4i}$ | $D_{6h}=D_{6i}$ | $D_{3d}=D_{3i}$ | $O_h=O_i$ |

[1] Upon rotation by $\varphi=\frac{\pi}{4}$.

The physical properties with which we are concerned are, on the one hand, quantitatively characterized by a finite set of parameters and, on the other hand, independent of the Cartesian system to which they are referred though certain special orientations of the frame will be distinguished by virtue of the simplicity of description. While the numerical values of parameters used, e. g., those of the dielectric stiffness coefficients, are dependent on the orientation, the core of the information they convey, e. g., the values of the three principal dielectric stiffness, are not. In the last analysis, the mathematical description of any physical system leads to such compound quantities which have a core invariant under certain classes of transformations; such quantities are called tensors. The present case involves only the simplest class, viz., linear, and more specifically, orthogonal transformations.

Physical quantities totally unrelated to any reference system, such as temperature, entropy, hydrostatic pressure, etc., are called scalars or tensors of zero rank. Vectors as, in our case, the electric field and dielectric displacement, are tensors of first rank; their only orthogonally invariant property is their magnitude, which thus is a scalar quantity.

The compound consisting of the coefficients of linear interrelation between two vectors represents a tensor of the second rank; e. g., a stress tensor represents a linear association between the normal of an infinitesimal surface element obtained by an imaginary cut through an elastic continuum and the force per unit area to be applied to that element in order to procure static equilibrium. Other tensors of the second rank involved here are the strain and the dielectric tensor. All these tensors are symmetrical, i. e., composed of only $$\binom{3+1}{2}=6$$

independent elements instead of $3^2=9=$ number of dimensions to the power of the rank, as would obtain in general. The symmetry is a consequence of physical laws; static equilibrium, i. e., absence of torque in the case of the stress tensor, the energy principle in the case of the dielectric tensor. The strain tensor itself is not symmetrical; but only its symmetrical part, the tensor of deformation, is of significance for elasticity, the skew remainder representing a rotation of a whole volume element without deformation. The 6 components have an invariant core of three; e. g., the three principal values obtained by rotation to principal axes.

Piezoelectricity is linear interaction between the electrostatic vectors and the elastic tensors; thus the set of the piezoelectric stiffness coefficients used in here forms a tensor of rank 3. It contains therefore in general $3\times 6=18$ elements representing the various possible interactions between a vector and a symmetric tensor of rank 2.

Elasticity describes the linear interactions between stress and strain. By virtue of the energy principle, interaction between particular stress and strain components is the same as that between the corresponding strain and stress. The elastic stiffness tensor of rank 4 with which we are dealing is therefore triple-symmetric and contains, in general, $$\left(\binom{3+1}{2}_2+1\right)=21$$

independent elements (instead of $$\binom{3+1}{2}^2=36$$

as without the latter symmetry or $3^4=81$ as without any symmetry).

Macroscopic crystallographic symmetry signifies invariance of all physical properties under certain sets of geometrical operations. Their application to specific physical properties simplifies, i. e., reduces the number of independent invariant entities of, the associated tensors. Detailed pursuit of these known effects and specific interpretation of them leads directly to the details of this invention. This pursuit is kept throughout within the realm of visualization by making use of the following three easily verifiable facts:

1. Simultaneity of some elements of symmetry imply others; e. g., two of the three elements: digonal axis, horizontal mirror plane, center of symmetry, imply the third.

2. "Even" properties, i. e., those associated with tensors of even rank have centro-symmetry by nature, while "odd" properties are incompatible with it. This is readily understood: interaction between any even number of vectors remains unchanged when all vectors are inverted, because $(-1)^{2n}=1$; interaction between an odd number of vectors, on the other hand, changes its sign without effecting the modulus, and the postulate of invariance under inversion thus nullifies odd-rank properties. All crystal classes featuring a center of symmetry are therefore non-piezoelectric and may be dismissed for the present purpose. On the other hand, classes whose crystallographic symmetries differ by centro-symmetry alone, have identical elastic and dielectric properties. Also, elements of symmetry which in combination engender a center of symmetry but no other element, are elastically and dielectrically identical and piezoelectrically complementary.

3. Multiplicity of a symmetry element of an order higher than the rank of the tensor associated with a particular physical property implies isotropy of this property with respect to the geometrical operation involved. For instance, existence of an axis of multiplicity 3 or more implies dielectric independence of the angular position about the $z$-axis; this holds regardless of the nature of the axis, i. e., whether rotation or rotation-inversion, etc., by virtue of fact No. 2. Also, the hexagonal system is isotropic about the $z$-axis as far as the elastic properties are concerned. Similarly, a four or six-fold rotation axis engenders rotational piezoelectric isotropy, but this is not true for an inversion-rotation axis. It also follows that the holoaxial octahedral class $O=T_b$ of the cubic system though not centro-symmetric must be non-piezoelectric by virtue of the presence of three four-fold rotation axes implying total isotropy, i. e., disappearance of the piezoelectric tensor. We are thus left with 20 piezoelectric crystal classes.

The facts just explained invite the introduction of elements of limited crystallographic symmetry, in terms of which this invention is best formulated, as was indicated upon introduction of the concept of unconditionality. These are elements of symmetry which are valid only with respect to certain physical properties or groups of properties. The term "crystallographic symmetry" without qualification should be understood to refer to all physical properties. Limited symmetry elements need not necessarily be unconditional, i. e., their orientation with respect to crystal axes may, and does in some cases, depend on the parameter ratios associated with the particular physical propertity(ies) to which they are limited. It is emphasized, however, that even limited symmetry elements are crystallographic, i. e., their existence, as differentiated from their orientation, is not predicated on special numerical ratios of certain parameters, but guaranteed for any numerical set of parameters consistent with the crystallographic symmetry of the crystal class under consideration. Some examples of limited symmetry elements used later on will be given.

First of all, if the addition of another element of symmetry to a certain class does not change any tensor up to and including rank 4 simply because these tensors have already reached the highest possible degree of simplicity short of total isotropy or total disappearance, respectively, then the two crystal classes are not different in their dielectric, piezoelectric and elastic properties, i. e., for the purpose of this invention. This holds for the two polar classes of the cubic system, the tetrahedral class T and the class $T_d$ obtained by adding diagonal planes, the only cubic piezoelectric classes; T and $T_d$ represent, accordingly, the same electro-elastic cubic symmetry. Similarly, a mirror plane and a digonal axis normal to it are equivalent symmetry elements as far as even-rank properties are concerned. Either of them can therefore be referred to as "even-rank plane of symmetry." On the other hand, an "elastic plane of symmetry" or "elastic digonal axis," which means the same, is a symmetry element limited to tensors of the fourth rank and has, in general, no significance for the dielectric and other properties; it is therefore conditional, i. e., its orientation will depend on the elastic parameter ratios. There are other limited elements of symmetry of obvious significance.

With respect to the drawings, Fig. 1 shows the disposition of axes and the pure shear waves possible for an even-rank plane as sole element of crystallographic symmetry as realized in the monoclinic system; 1A shows the transformation from an $\overline{X}$—$\overline{Y}$ to the $\overline{X}'_0$—$\overline{Y}'_0$ system of axes, 1B the disposition of the unconditionally pure double-series shear modes and 1C, of the two conditionally pure single-series shear modes.

Fig. 3 shows the case of a trigonal axis as sole element of crystallographic symmetry; 3A and 3B illustrate the double rotation by angles $\varphi_0$ and $w_0$ from an $Z$—$\overline{X}_0$—$\overline{Y}_0$ frame to the reference frame oriented according to the conditionally pure shear modes, 3C show the disposition of the double-series mode and 3D of the two single-series modes.

Figure 6:
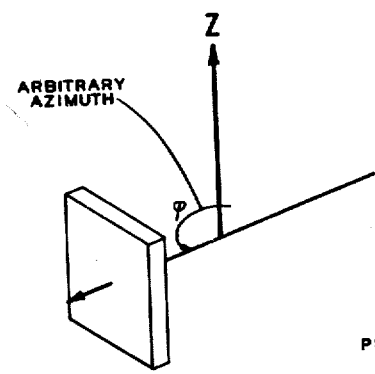
Figure 7:
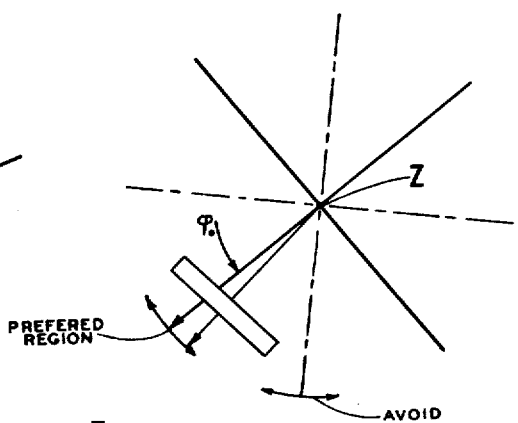
Figure 8:
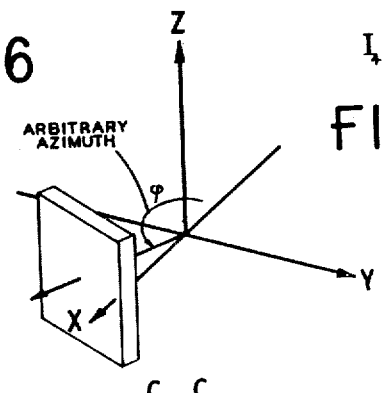

Fig. 6, for the monocyclic polar tetragonal and hexagonal classes $C_4$ and $C_6$;

Fig. 7, for the monocyclic inverse tetragonal class $I_4(=S_4)$;

Fig. 8, for the dicyclic polar tetragonal and hexagonal classes $C_{4v}$ and $C_{6v}$;

Fig. 9, for the dicyclic inverse tetragonal class $I_{4v}=V_d$;

Fig. 10, for the monocyclic inverse hexagonal class $I_6(=C_{3h})$;

Fig. 11, for the dicyclic inverse hexagonal class $I_{6v}(=D_{3h})$ and the dicyclic polar trigonal class $C_{3v}$;

Fig. 12, for the two polar cubic classes T and $T_d$.

The Table 2 in Column 34 is a table representing a classification of all crystal classes from the point of piezoelectricity, in particular, of applicability for thickness-controlled pure shear, especially, unconditionally pure shear, operation, stressing degeneracy and double series excitability.

Table 3 in Columns 33 and 34 is a condensed survey of all classes permitting piezo-active thickness-controlled unconditionally pure shear operation; it gives all the relevant quantitative data in form of a table.

The various piezoelectrically active unconditionally pure shear cuts will now be obtained in two steps by successive exclusion: First, the elastic properties, which in general encompass the dielectric ones by virtue of the ranks of the associated tensors, are considered alone, and all cases of unconditionally pure shear are registered and, as a corollary, also the conditional ones; this step thus involves the establishment of necessary, but not sufficient, conditions. Secondly, those cuts are selected which are piezo-active; this involves division into single- and double-series cuts and noting of piezoelectric and dielectric-piezoelectric interaction with face shear or normal components. Both steps will encompass, as a corollary, the conditionally pure shear cuts, in particular, those of the monocyclic trigonal classes, which are outside the realm of this invention.

It has been shown that the existence of a pure (single-series) shear wave in an elastic medium is predicated on five conditions of the form: $c'_{p\alpha}=0$; $p\neq\alpha$. On the other hand, it can be shown that the element of lowest limited crystallographic symmetry capable of independent existence is that of an even-rank plane of symmetry (Z-plane). It is well known and can easily be visualized that this symmetry eliminates all interactions between the two following groups of elastic components; the normal components and the shear component in the z-plane; and the two shear components in planes containing the z-axis [1]:

---

[1] *Visualization.*—The elements of the first group are invariant under reflection on the z-plane (or under rotation by $\pi$ about the z-axis) while those of the second group change their signs; therefore, the operation permits interaction between elements of the same group, but nullifies inter-group interaction.

$$c_{4p}=c_{5p}=0; \ p=1, 2, 3, 6$$

This result represents a property of the mirror plane and is therefore independent of the location of the axes X and Y; as a matter of fact, in the monoclinic system, which as far as even-rank properties are concerned, is based on this as sole element of symmetry, X and Y are not determined at all by virtue of crystallographic symmetry and are therefore $\overline{X}$, $\overline{Y}$ axes. Upon rotation of the system about the Z-axis, the digonal symmetry requires $c'_{44}$, $c'_{55}$ and $c'_{45}$ to be periodic functions of $2\varphi$, which correspond to the expressions for the lengths and mutual projection of conjugate diameters of an ellipse in general position:

$$c'_{44;55}=\frac{1}{2}(c_{44}+c_{55})\pm\left[\frac{1}{2}(c_{44}-c_{55})\cos 2\varphi - c_{45}\sin 2\varphi\right]$$

$$c'_{45}=-\frac{1}{2}(c_{44}-c_{55})\sin 2\varphi - c_{45}\cos 2\varphi$$

or introducing the mean $c_m\equiv\frac{1}{2}(c_{44}+c_{55})$, the digonal stiffness variation $$c_{di}=\sqrt{\left[\frac{1}{2}(c_{44}-c_{55})\right]^2+c_{45}^2}$$

and the azimuth $$\varphi_0=\frac{1}{2}\tan^{-1}\frac{2c_{45}}{c_{55}-c_{44}}\ \text{mod}\ \frac{\pi}{2}$$

of zero interaction:

$$c'_{44;55}=c_m\pm c_{di}\cos 2(\varphi-\varphi_0); \ c'_{45}=-c_{di}\sin 2(\varphi-\varphi_0)$$

In the non-interaction positions $$\varphi_0\ \text{mod}\ \frac{\pi}{2}$$

the shear stiffness coefficients take on the extremum values $$c^{(e)}_{44;55}=c_m\pm c_{di}$$

a special instance of a general property mentioned before. These are always positive, in view of $c^2{}_{45}<c_{44}c_{55}$, a special case of the positivity law of the elastic energy referred to earlier.

In the ensuing $(\overline{X}'_0,\overline{Y}'_0,Z)$-system illustrated in Fig. 1A with the $\overline{X}$-$\overline{Y}$-system shown in dashed lines and the $\overline{X}'_0$-$\overline{Y}'_0$-system in full lines, we have thus $$c^{(o)}_{4p}=0 \text{ for } p\neq 4, \; c^{(o)}_{5p}=0 \text{ for } p\neq 5$$

i. e., the lowest element of elastic symmetry produces already unconditionally pure shear waves. This sets in evidence the fact that the conditions $c'_{pd}=0$; $p\neq\alpha$ for single series pure shear alone do not correspond to any type of crystallographic symmetry. The shear waves produced are double-series with $z$ as direction of propagation, $$\varphi_0 \text{ mod } \frac{\pi}{2}$$

as directions of displacement and with the wave stiffnesses, $c_{44}\pm c_{45}$, "wave stiffness" being the product of density and square of phase velocity. The directions of displacement, as differentiated from that of the phase planes, are conditional. These conditions are shown in Fig. 1B. The practical significance of this fact as far as the cutting of crystal plates is concerned, is decidedly minor and will be taken up later.

Absence of interaction with the two shear modes 4 and 5 makes $$c^{(o)}_{55;44}$$

also wave stiffnesses of single-series pure shear waves with displacement $u_3$ and propagation directions $\overline{X}'_0$ and $\overline{Y}'_0$ as illustrated in Fig. 1C; but these waves are conditionally pure.

The properties of the two even-rank-equivalent monoclinic classes: $C_2$ (digonal axis) and $L_2(=C_s)$ (mirror plane) [the third monoclinic class $C_{2h}=C_{2i}$ being centro-symmetric, i. e., non-piezoelectric] are thus described as far as they concern the present phase of the subject. As all the other crystal classes with the exception of the monocyclic trigonal classes contain the same element of even-rank symmetry, all unconditionally pure elastic shear cuts follow easily.

The orthorhombic system is characterized by two mutually normal even-rank planes Z and X, which induces the third, Y. It follows at once that each crystallographic axis is a direction of unconditionally pure double-series shear waves with directions of displacement unconditionally along the two other axes. The wave stiffnesses (velocities) are stationary, their magnitudes are $c_{\alpha\alpha}$, and the associated displacements, $u_i$. No other pure shear waves can in general exist. The piezoelectric classes: $V=D_2$ (holoaxial, three digonal axes; quaternion-group) and $C_{2v}$ (polar, digonal axis, two vertical planes) are involved; $V_h=V_i$ is not piezoelectric.

The basic symmetry element of the tetragonal system is a fourfold rotation axis (class $C_4$—monocyclic polar); elastically equivalent is the fourfold rotation-inversion axis (class $I_4(=S_4)$—monocyclic inverse); $C_{4h}=C_{4i}$ (monocyclic central) is not piezoelectric. The fourfold symmetry produces two simplifications of the elastic properties transcending those of digonality. The first concerns the shear properties in planes containing the crystallographic axis: It was shown that by virtue of digonality alone the set $c'_{44}(\varphi)$, $c'_{55}(\varphi)$, $c'_{45}(\varphi)$, though in general part of a fourth-rank tensor, transforms under $z$-rotations as a second-rank tensor; therefore, the previously cited fact No. 3 states that if the $z$-axis involves symmetry of multiplicity higher than two, it becomes an axis of semi-isotropy for this set of shear parameters, meaning $$c'_{44}(\varphi)=c_{44}=\text{constant}, \; c'_{45}(\varphi)=0$$

This state of affairs being akin to the degeneration of an ellipse into a circle or more generally, to the confluence of eigen-values with attendant degeneracy of eigen-functions, shall be called degeneracy; i. e., in the present case, of the (wave) stiffness $c_{44}$.

The second effect of tetragonality concerns the elastic properties in the $z$-plane; here invariance under 90°-rotations evidently eliminates interaction between face shear and normal $z$-stress: $c_{36}=0$ and is synonymous with equality of the two normal stiffnesses in the $z$-plane and of their cross-factors with the $z$-component:

$$c_{11}=c_{22} \text{ and } c_{13}=c_{23}$$

and, considering the change of sign of face shear under 90°-rotation, of the two interactions with face shear: $c_{16}+c_{26}=0$. The remaining stiffness coefficients $c'_{11}=c'_{22}$, $c'_{66}$, $c'_{12}$ and $c'_{16}=-c'_{26}$ must be periodic functions of $4\varphi$ upon rotation about $z$. The corresponding expressions are:

$$c'_{11}= \; c'_{22}=c_{11}-c_{a1}+c_{a1}\cos 4\varphi+c_{16}\sin 4\varphi$$
$$c'_{66} \qquad =c_{66}+c_{a1}-c_{a1}\cos 4\varphi-c_{16}\sin 4\varphi$$
$$c'_{12} \qquad =c_{12}+c_{a1}-c_{a1}\cos 4\varphi-c_{16}\sin 4\varphi$$
$$c'_{16}=-c'_{26}= \qquad c_{a1}\sin 4\varphi-c_{16}\cos 4\varphi$$

the stiffness coefficient $c_{a1}\equiv\frac{1}{4}(c_{11}-c_{12}-2c_{66})$ introduced here indicates aeolotropy, i. e., its vanishing signifies elastic isotropy about the $z$-axis. Denoting again by $$\varphi_0 \text{ mod } \frac{\pi}{4}$$

the zero-interaction azimuth $$\tan 4\varphi_0=\frac{c_{16}}{c_{a1}}$$

and introducing the tetragonal stiffness variation $$c_{tetr}\equiv\sqrt{c^2{}_{a1}+c^2{}_{16}}$$

this reads:

$$c'_{11}= \; c'_{22}=c_{11}-c_{a1}+c_{tetr}\cos 4(\varphi-\varphi_0)$$
$$c'_{66} \qquad =c_{66}+c_{a1}-c_{tetr}\cos 4(\varphi-\varphi_0)$$
$$c'_{12} \qquad =c_{12}+c_{a1}-c_{tetr}\cos 4(\varphi-\varphi_0)$$
$$c'_{16}=-c'_{26}= \qquad c_{tetr}\sin 4(\varphi-\varphi_0)$$

showing again extremization associated with disappearance of interaction. Successive positions $$\varphi-\varphi_0=0, \frac{\pi}{4}, \frac{\pi}{2}, \text{ etc.},$$

maximize and minimize alternatively. Again, elementary calculation verifies the result that the conditions $$c_{66}>c_{tetr}-c_{a1}$$

and $$c_{11}>c_{tetr}+c_{a1} \text{ for } c'_{11}(\varphi)>0, \; c'_{66}(\varphi)>0$$

are synonymous with the inequalities $$(c_{11}-c_{12})c_{66}>2c^2{}_{16} \text{ and } c^2{}_{11}>c^2{}_{12}$$

obtained directly from the condition that the quadratic form representing the elastic energy be positive definite.

The scheme of elastic relations thus presented determines immediately the various pure shear modes engendered by the element of four-fold symmetry: Evidently, degenerate and therefore unconditionally pure single-series shear waves with velocity $$\sqrt{\frac{c_{44}}{\delta}}$$

exist both as $z$-waves with arbitrary displacement in the z-plane and as waves with displacement $u_3$ propagating in any direction of the z-plane. This is illustrated by Figures 2B and C. For the particular directions $$\phi_0 \bmod \frac{\pi}{4}$$

indicated by Figure 2A with the $\overline{X}$—$\overline{Y}$ system shown in dashed lines, the $\overline{X}'_0$—$\overline{Y}'_0$ in full lines, and the bisector system in dot-dash lines, the latter waves are double-series, but the components with displacement in the z-plane are obviously conditionally pure; their wave stiffnesses are alternatively $$\bmod \frac{\pi}{4}: \frac{1}{2}(c_{11}^{(0)} - c_{12}^{(0)}) \text{ and } c_{66}^{(0)} \text{ or: } c_{66} + c_{61} \pm c_{6\text{tot}}$$

These conditions are illustrated in Figures 2D and E.

The addition of any subsidiary element of symmetry such as horizontal digonal axis or vertical plane, which does not lead beyond the tetragonal system, has the effect of making $c_{16} = 0$, i. e., $\phi_0 = 0$ and thus determining the axes X and Y. This corresponds entirely to the step from the monoclinic to the orthorhombic system. Therefore, the directions of double-series pure shear waves become X and Y and their bisectors; the waves are now unconditional with respect to both shear components with the wave stiffness $c_{44}$ associated with displacement $$u_3, c_{44} \text{ with } u_1, u_2 \text{ and } \frac{1}{2}(c_{11} - c_{12})$$

with the bisectors. The crystal classes involved are: $D_4$(holoaxial; fourfold axis, horizontal digonal axes), $C_{4v}$(dicyclic polar; fourfold axis, vertical planes) and $I_{4v} = V_d$(dicyclic inverse; fourfold inversion axis, vertical planes; also obtained from the orthorhombic holoaxial class V by addition of diagonal planes; crystallographic X and Y axes of $I_{4v}$ and $V_d$ bisect mutually); the holoaxial class $D_{4i} = D_{4h}$ is non-piezoelectric.

The seven classes of the hexagonal system, which correspond, one by one, to those of the tetragonal system, are identical among themselves as far as their elastic (and dielectric) symmetry properties are concerned. These are characterized by the two features of elastic isotropy about the z-axis, in accordance with the previously cited fact No. 3, and by the implication of trigonal crystallographic symmetry:

$$c_{66} = \frac{1}{2}(c_{11} - c_{12}) \text{ or } c_{61} = 0$$

according to the previous notation. Only the first of the two is directly relevant to the present object. It engenders, besides the degenerate pure z-waves with stiffness $c_{44}$ already existing under tetragonality, double-series unconditionally pure shear waves for any direction of propagation in the z-plane, with wave stiffness $c_{44}$ associated with displacement $u_3$, and $c_{66}$ with transverse displacement normal to z. The crystal classes involved are: the monocyclic classes $C_6$, $I_6(=C_{3h})$, $D_6$ and $C_{6i}(=C_{6h})$, the latter non-piezoelectric; and the dicyclic classes $C_{6v}$, $I_{6v}(=D_{3h})$ and $D_{6i}(=D_{6h})$, the latter non-piezoelectric.

In the cubic system, all classes are elastically identical (and dielectrically isotropic). All axes $X_i$ are of equal status and tetragonal. Therefore, they are directions of degenerate shear wave propagation with stiffness $c_{44}$ and the directions bisecting two axes carry double-series unconditionally pure shear waves with stiffness $c_{44}$ for the displacement parallel to the third axis and $$\frac{1}{2}(c_{11} - c_{12})$$

for the other transversal component.

As mentioned before, the trigonal system is the only crystallographic system not based on the mirror plane or digonal axis as fundamental or implied even-rank element of symmetry. It has also been previously stated that its fundamental element of symmetry, the threefold axis, does not by itself admit unconditionally pure shear waves. Visualization of this matter will again illustrate the differentiation between unconditional and conditional shear purity and thus this invention from prior art.

The class $C_3$ embodies a trigonal axis only and therefore leaves the azimuthal axes indeterminate. It can be concluded quite formally from the fact that trigonality permits only seven independent elastic parameters, that planes of elastic symmetry must exist and therefore pure shear waves, but that their orientations must be dependent on the stiffness ratios. In particular, the argument employed before shows that the one of the two interfering shear-shear interaction coefficients can be eliminated by a suitable rotation $$\varphi_0 \bmod \frac{\pi}{3}$$

about Z. The procedure involved is the same as in the digonal and tetragonal case and the result:

$$\tan 3\varphi_0 = \frac{c_{25}}{c_{14}}$$

see Figure 3A (in order to avoid the confusion of too many lines, all three $\overline{X}$-axes are shown, but only one each of the $\overline{Y}$-, $\overline{X}'_0$- and $\overline{Y}'_0$-axes). This operation makes the three equivalent $\overline{X}'_0$-axes thus obtained elastic, but not even-rank, digonal axes. The displacement directions of the associated conditionally pure double-series shear waves are not parallel and normal to Z, but form odd angles with it. The frame associated with the double-series waves is thus reached only after another rotation, this time about the $\overline{X}'_0$-axis by $$v_0 \bmod \frac{\pi}{2}$$

with $$\tan 2v_0 = \frac{4\sqrt{c^2_{14} + c^2_{25}}}{c_{11} - c_{12} - 2c_{44}}$$

which rotation nullifies the other interaction coefficient; see Figure 3B. Again, in this frame ($\overline{X}'_0$, $Y''_0$, $Z'_0$) shown in Figures 3C and D, the shear stiffnesses are extremized. The frame has evidently two possible orientations differing by $$\frac{\pi}{2} \text{—rotation about } \overline{X}'_0$$

each having, in turn, three crystallographically equivalent positions via rotation by $$\frac{2\pi}{3} \text{ about Z, } \frac{\pi}{3} \text{—rotation about Z}$$

being equivalent to $$\frac{\pi}{2} \text{—rotation about } \overline{X}'_0$$

In reference to this wholly conditional frame, double-series pure shear propagation obtains in the $\overline{X}'_0$-direction with displacements $u''_2$ and $u'_3$.

and single-series propagation in directions $Y''_0$ and $Z'_0$ with displacement $u'_1$, exactly as in the corresponding, but, as far as the direction of the double-series waves is concerned, unconditional case of digonality. Figure 3 illustrates these conditions. The extremal wave stiffness coefficients are $$\tfrac{1}{4}(c_{11}-c_{13}+2c_{44}) \pm \sqrt{\left[\tfrac{1}{4}(c_{11}-c_{13}-2c_{44})\right]^2+c^2_{14}+c^2_{15}}$$

The Z-axis is direction of shear, but not pure shear, propagation because of interaction with the latent normal stresses.

Introduction of horizontal digonal axes as subsidiary element of crystallographic symmetry leads to the holoaxial class $D_3$ to which quartz belongs. The transition from $C_3$ to $D_3$ corresponds to that from $C_2$ to $V$ or $C_4$ to $D_4$ and has thus the effect of fixing the X-Y axes by virtue of crystallographic symmetry; in consequence, $c_{35}$ is nullified, i. e., the three X-planes become unconditional even-rank planes; this eliminates the azimuthal rotation by $\varphi_0$ which was required in case of $C_3$ and simplifies the preceding results accordingly.

The remaining monocyclic trigonal class $C_{3i}(=S_6)$ has a center, same as the corresponding dicyclic class $D_{3d}(=D_{3i})$. The only other trigonal class is the dicyclic class $C_{3v}$ which has three equivalent crystallographic planes. It is therefore equivalent to $D_3$ as far as even-rank properties are concerned.

All cases of pure shear wave propagation (short of total isotropy), unconditional as well as conditional, which are possible in nature by virtue of the elastic properties alone, have thus been determined. There follows the second and final step, in accordance with the procedure outlined, in which those cases are selected where one or both thickness shear modes interact with the longitudinal electrical component; apart from the question of conditionality, we shall also note, in each case, the existence and character of other piezoelectric and dielectric-piezoelectric interactions to which this component is a partner.

Before embarking on this final phase it is well to recall the previous discussion of the dependence of the elastic parameters on the electric operating conditions upon introduction of the piezoelectric interactions. The superscript signs adopted there to indicate the principal dielectric conditions will, however, be omitted in the following in order not to overburden the notations, the significance of the stiffness parameters being well understood from that preceding discussion. This refers to the following as well as to the application of the results of the immediately preceding part in connection with the piezoelectric effects. In particular, as far as the case of unconditionally pure shear modes is concerned, it is recalled that independence of orientation of the electrical conditions is one of their features; thus for the elastic stiffness parameter of such a mode: $c=c^*$ for open-circuit, and it is immaterial whether $c$ is so understood or is understood to mean the short-circuit value $$c^*=c(1-\kappa^2), \kappa = \frac{h}{\sqrt{c\beta}}$$

representing the piezoelectric coupling factor of the mode. In case of conditionally pure modes, orientation is dependent on the electrical conditions, and it is necessary to bear this in mind (in case of frequency control elements, operating conditions are in general closer to short-circuit as pointed out previously).

Figure 4:
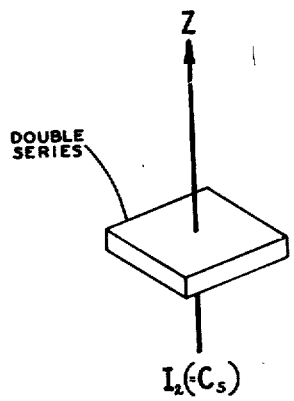
Fig. 4 shows the orientation of a piezoelectrically active crystal plate involving thickness-controlled unconditionally pure shear modes for a material of the monoclinic class $I_2(=C_s)$.

Starting again with the fundamental case, i. e., the monoclinic system, it can be shown that of the two even-rank (elastically, dielectrically) equivalent, odd-rank (piezoelectrically) complementary classes $C_2$ and $I_2(=C_s)$, the latter is the one in which the longitudinal electrical component interacts with the two unconditionally pure shear modes shown in Figure 1B. This fact can be visualized by noting that the longitudinal electrical component as well as the two elastic shear components in planes containing Z are inverted by reflexion on the z-plane, while the transversal electrical components and the unwanted four elastic components are not affected by it. Therefore, they arrange themselves in these two mutually non-interacting groups. Evidently, there is no dielectric longitudinal-transversal interaction. A crystal plate cut accordingly and thus providing two independent harmonic series of piezo-active unconditionally pure thickness shear mode resonances is illustrated in Figure 4. Provided the piezoelectric coupling factors of both modes are of satisfactory magnitude, the double-series property represents a practical asset for frequency control inasmuch as it permits the same crystal plate to be used for the excitation of either one or the other resonance frequency and its harmonic overtones; selection may be performed instantaneously by corresponding switching arrangements for the subsidiary tuning elements.

For the class $C_2$, the elasto-piezoelectric combination is complementary to $I_2$ by virtue of previously cited fact No. 2; i. e., all unwanted modes are, no wanted mode is, excited. It permits, however, via the piezoelectric interactions between the electrical components (1,2) and the shear components (4,5), single-series pure shear excitation, though conditional, for the $\overline{X}'_0$- and $\overline{Y}'_0$-cuts, with displacement $u_3$ and wave stiffnesses $$c^{(o)}_{44} \text{ and } c^{(o)}_{55}$$

as was illustrated in Figure 1C. These cuts are not only conditional, but have the additional drawback that the associated fields interact also with the face shear mode both directly as well as via dielectric-piezoelectric interaction. The data for class $C_2$ is given at the end of this specification.

While the Z-cut of $I_2$ as illustrated by Fig. 1B and Fig. 4 is thus double-series unconditionally pure with wanted piezo-excitations only, the associated directions of displacement are conditional. It was stated before without explanation that this fact is of minor practical significance. Some statements concerning the question of orientation of the minor faces of pure shear plates are therefore called for.

It would appear at first consideration that the contour shapes of pure shear plates should be entirely immaterial as the motions involved are purely transversal. However, two previously discussed subsidiary effects associated with the boundary conditions along the contour, the inertia interaction with flexural modes and dielectric-piezoelectric boundary interaction, should be considered in this connection. While the second effect appeared to be generally of negligible magnitude and is ruled out by crystallographic symmetry in all cases of unconditionally pure shear, the first effect was found to be of some nuisance value as interaction with flexural modes which, however, proved to be suppressable by means well known to the art. In the present connection, this effect may provide an additional type of interaction: if the boundary is at an angle with the mutually orthogonal transversal motions which, in case of $I_2$, are both piezo-excitable they are, by this effect, both inertia coupled with longitudinal motion and therefore with each other. However, this interaction is clearly negligible as its order of magnitude is that of the original suppressable effect squared; moreover, the close proximity necessary for interaction between the two natural shear frequencies or of any of their odd harmonics would be a highly improbable coincidence. It follows that the contour shape of a pure high frequency shear plate is largely immaterial and may be determined by other practical considerations such as best utilization of the growing properties of the mother crystal in case of synthetic material. There is one exception: in the single-series cases, the lateral dimension normal to the motion is obviously entirely irrelevant and, if desired, may be reduced to the point where the impedance of the plate becomes too high or stray capacity starts to decrease the piezoelectric coupling noticeably; evidently, in this case, the lateral boundaries of the crystal plate must be aligned with the direction of motion. Thus, for all plates, the shape may be other than square; the drawings, however, for simplicity sake, show them as square.

As far as the monoclinic system is concerned, the Z-cut of class $I_2(=C_2)$ as shown in Figure 4 is thus claimed; it gives piezoelectric double-series unconditionally pure high frequency shear vibrations with no unwanted piezoelectric interactions and with the frequency spectra $$\frac{2n+1}{2t}\sqrt{\frac{c_{44}^{(o)}}{\delta}} \text{ and } \frac{2n+1}{2t}\sqrt{\frac{c_{55}^{(o)}}{\delta}}$$

for open circuit ($t$—thickness, $\delta$—density), the case of different electrical conditions, i. e., the impedance function, having been discussed before.

Progression to the orthorhombic system shows immediately that the holoaxial class $D_2=V$, which corresponds to $C_2$, is useless for our purpose: while the three coordinate planes are associated with unconditionally pure double-series shear, the digonal symmetry excludes the desired, admits the unwanted piezo-interactions.

Figure 5:
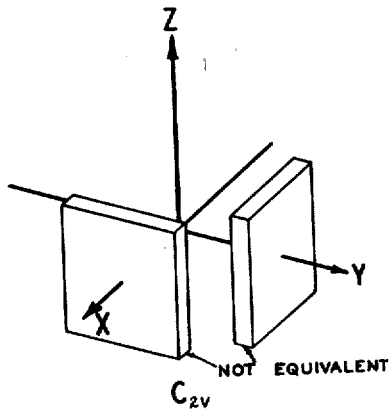
Fig. 5 illustrates the corresponding conditions for the orthorhombic class $C_{2v}$.

Formal analysis or visualizations of the type used before show at once that an element of crystallographic symmetry of multiplicity higher than two or a digonal axis in combination with other elements of symmetry preclude piezoelectric interaction between the axial electric components and the shear components in planes containing the axis. Application to the class $C_{2v}$ shows that the double-series unconditionally pure $z$-waves are not piezoactive. A similar consideration shows that of the corresponding $x$- and $y$-waves only the components with displacement $u_3$ and wave stiffnesses $c_{55}$ and $c_{44}$, respectively, are interacting with the electrical $x$- and $y$-components, respectively. These components do not interact piezoelectrically or dielectric-piezoelectrically with any other (unwanted) modes. Thus, the single-series unconditionally pure shear wave X- and Y-cuts with $z$-displacement are claimed; see Figure 5. The fact that these two cuts are not equivalent must be considered an asset: if, in a particular material belonging to $C_{2v}$, the piezoelectric coupling factor of the one mode is too weak or the temperature coefficient of the frequency constant too high to make it practically useful, the other mode may be satisfactory. $C_{2v}$ is unique in this respect: it will appear that in any of the other admissible classes, the different cuts in question are all equivalent.

Due to the general fact just stated and applied to $C_{2v}$, the $z$-axis (crystal axis) of all other systems and, in the cubic system, the three crystal axes $X_i$, drop out as possible orientations of crystal plates for the present purpose, as the associated unconditionally pure shear modes do not interact with the axial electric components.

Figure 2:
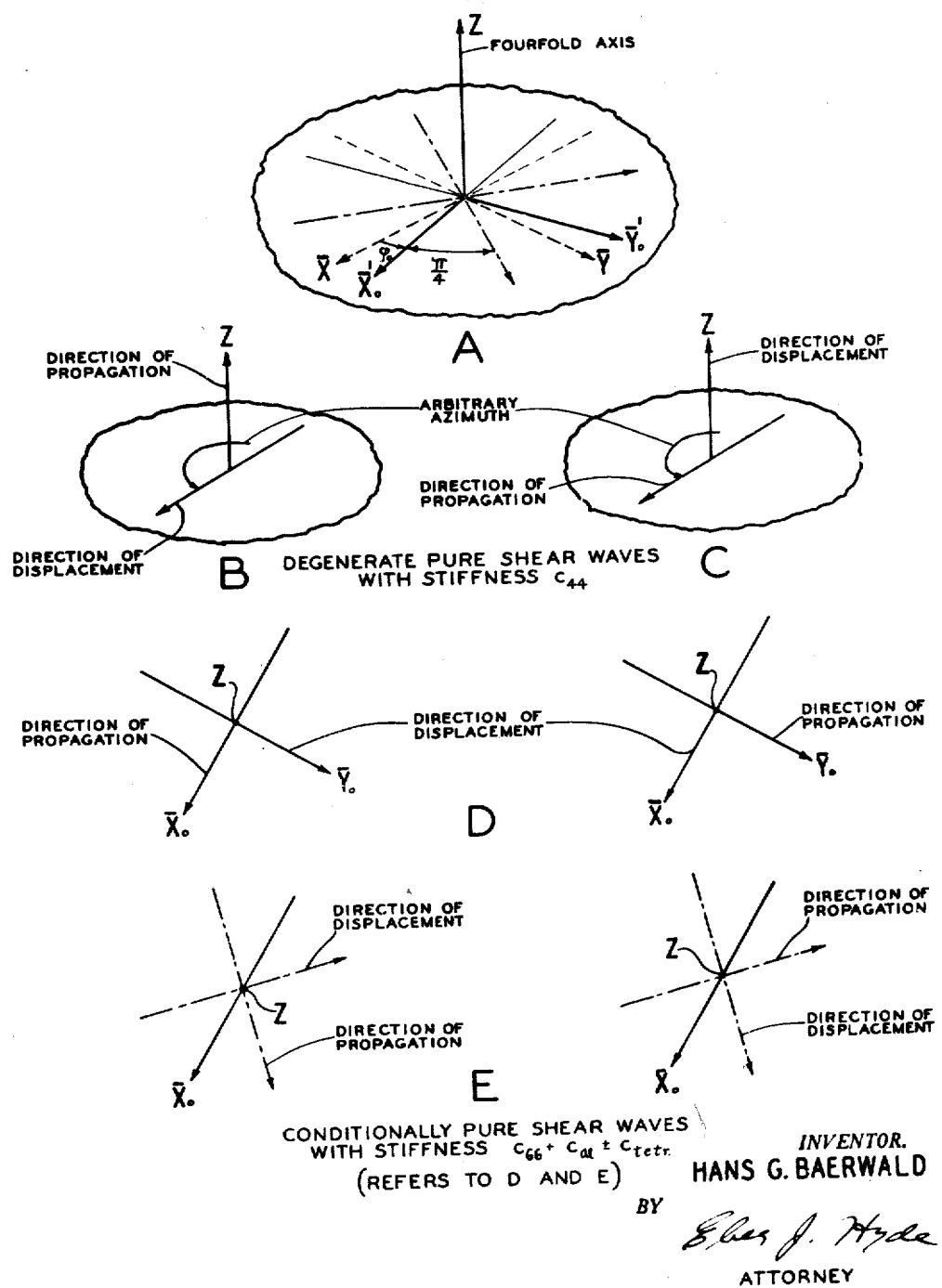
Fig. 2 illustrates the corresponding conditions for an even-rank four-fold axis as sole symmetry element; 2A corresponds to 1A; 2B and C illustrate the two degenerate pure shear modes, and 2D and E show the two conditional single-series modes.

In the fundamental tetragonal class $C_4$, three types of pure shear waves were found, two unconditional, and one conditional; see Figure 2. Of these, the first one (Figure 2B) drops out as $z$-wave, the last (2D,E), as embodying horizontal displacements, in analogy with the corresponding components in $C_{2v}$. The second type (2C) remains; it is the most valuable one by virtue of its degeneracy: any $\varphi$-cut, i. e., any cut containing the Z-axis is one of unconditionally pure single-series shear character and carries the desired piezoelectric interaction; motion $u_3$, wave stiffness $c_{44}(=c_{55})$. The piezoelectric coupling factor is also degenerate. However, the same electrical component interacts also degenerately with the face shear mode. This makes $C_4$ somewhat less desirable, though only mildly so, as according to the preceding discussion the nuisance value of this interaction is decidedly minor. Trouble would, of course, arise in case of substances where the desired interaction happens to be relatively weak, the undesired one relatively strong, but such materials would be of scant usefulness for the first reason alone. No other unwanted interaction is present. The cuts claimed and their properties are thus described; they are shown in Figure 6.

The monocyclical inverse class $I_4(=S_4)$ which is identical, as far as even-rank properties are concerned, with $C_4$, is in a limited sense odd-rank-complementary to it: While $C_4$ is degenerate elastically as well as with respect to both piezoelectric interactions with horizontal electrical components, the two piezoelectric coefficients are in case of $I_4$ proportional to $\cos 2(\varphi-\varphi_0)$ and $\sin 2(\varphi-\varphi_0)$, respectively; referred to an (arbitrary) $\bar{X}$-$\bar{Y}$-frame, we have $$\tan 2\varphi_0 = \frac{h_{14}}{h_{25}}$$

under open-circuit operation. Thus, while the wave stiffness is, as before, $c_{44}$ and the displacement direction, $z$, there are two crystallographically equivalent piezoelectrically conditional cuts $$\varphi_c \mod \frac{\pi}{2}$$

where the desired mode is maximally, the unwanted one not, excited, and the two bisecting cuts $$\varphi_0 + \frac{\pi}{4} \mod \frac{\pi}{2}$$

where conditions are reversed; for intermediate cuts, the two interactions change harmonically with $2\varphi$. Piezoelectric conditionality or "piezoconditionality" as it will be called for brevity's sake, does not, however, remove the class $I_4$ from the claimed domain of those admitting unconditionally pure thickness-controlled shear cuts, as it permits such piezoelectrically excitable cuts unconditionally free from all types of elastic interaction. Furthermore, the undesired piezoelectric component involved has little nuisance value, and it should be borne in mind that for most $\varphi$-cuts, i. e., excepting the neighborhoods of $$\varphi_0 + \frac{\pi}{4} \mod \frac{\pi}{2}$$

the properties of $I_4$ are no worse than those of $C_4$, and for the neighborhoods of $$\varphi = \varphi_0 \mod \frac{\pi}{2}$$

even better. In other words, the position $\varphi$ of the cut should be reasonably close to one of the positions $$\varphi_0 \mod \frac{\pi}{2}$$

but is not critical, i. e., certain practical disadvantages accruing from elastic conditionality as pointed out previously, are substantially absent. The cuts claimed and their properties are thus described. They are illustrated in Figure 7.

In the remaining piezoelectric monocyclic tetragonal class $D_4$ (holoaxial) as in the dicyclic classes, the X-Y-axes are well-defined by virtue of the secondary elements of symmetry, i. e., all conditionalities are eliminated. However, $D_4$ which corresponds to $D_2 = V$ admits none of the desired piezoelectric interactions, and is, therefore, of no interest here.

The class $C_{4v}$ is, within the domain of the odd-rank interactions admitted by $C_4$, odd-rank complementary to $D_4$ and thus has all the properties of $C_4$ minus the undesirable one of piezoelectric interaction with face shear. It thus belongs among the group of classes ideally suited for the present purpose: all $\varphi$-cuts (degenerate) are unconditionally single-series pure with absence of all undesired interactions of any kind; motion is $u_3$, wave stiffness, $c_{44}$. The cuts are shown in Figure 8.

The remaining piezoelectric tetragonal class $I_{4v} = V_d$ is elasto-electrically identical with the piezoelectrically halved class $I_4$; when realized simultaneously in two positions by $$\phi = \frac{\pi}{4}$$

$I_{4v}$ would represent unconditionalized $I_4$ in these respects. Therefore, $I_{4v}$ offers the $$\left(\phi_0 \mod \frac{\pi}{2}\right) - \text{cuts}$$

of $I_4$, but with $\varphi_0 = 0$, i. e., as X- and Y-cuts. This is true if the coordinate system is oriented according to the class notation $I_{4v}$, i. e., with the X-Y-axes normal to the vertical planes. The position of the axes according to $V_d$ bisects the former. In the latter position, the high frequency shear mode is thus inactive, the face shear mode active, just as for any $\varphi$-cut in case of $D_4$. The accuracy of the X or Y-cut which, again, is single series unconditionally pure with displacement $u_3$, stiffness $c_{44}$ and without any unwanted interactions, is not critical, as was the case for $I_4$; but as $I_{4v}$ has anyhow the asset of piezo-unconditionality, this can hardly be claimed as a separate advantage. The orientation of the two equivalent cuts is depicted in Figure 9; according to the more common usage, the crystal axes are referred to the class notation $V_d$.

As far as electro-elastic properties associated with equatorial fields and shear in azimuthal planes is concerned, the hexagonal classes $C_6$ and $C_{6v}$ are identical with the corresponding tetragonal classes $C_4$ and $C_{4v}$, respectively. This follows at once from the principles applied heretofore. Claimed, therefore, are the degenerate $\varphi$-cuts with displacement $u_3$ and wave stiffness $c_{44}$; no undesired interaction is present in case of $C_{6v}$, piezoelectric interaction with face shear in case of $C_6$. The figures 8 and 6, respectively, apply.

The four crystallographic classes $C_4$, $C_6$, $C_{4v}$, $C_{6v}$ thus have, for the present purpose, the common property of admitting (degenerate) $\varphi$ cuts with unconditionally pure single-series shear cuts. The corresponding property of crystallographic symmetry which they have in common is that their sole element of axial crystallographic symmetry is a rotation axis of order higher than three: according to table I, all other classes in the tetragonal or hexagonal columns have either a rotation-inversion axis or additional (digonal) rotation axes; and in the only other column where this property might be found, namely, the cubic system, the basic symmetry automatically includes three-fold axes.

The hoxoaxial class $D_6$ is unsuited for the same reason as $D_2 = V$ and $D_4$.

The two inverse hexagonal classes have a piezoelectric character quite different from the corresponding tetragonal classes, which is understood from the facts that this is an odd-rank property and that rotation-inversion is related to rotation of half-multiplicity; therefore, the inverse hexagonal classes embody, apart from their elastic rotatory isotropy, certain trigonal symmetry properties.

Class $I_6 (= C_{3h})$ resembles $I_4$ insofar as it is also piezo-conditional and as the equation for the preferred azimuth is similar: referred to an $\overline{X}\text{-}\overline{Y}$-frame, $$\tan 3\phi_0 = \frac{h_{11}}{h_{22}}$$

under open-circuit condition, with three equivalent positions, the azimuthal dependence of the desired piezoelectric coefficient being $$h'_{16} = -\sqrt{h^2_{11} + h^2_{22}} \cdot \cos 3(\phi - \phi_0)$$

But there is the difference that while the wave stiffness is still $c_{44}$, the displacement of the piezoactive shear wave is horizontal instead of vertical, as it was in all previous cases. Similarly, azimuthal deviation from the conditional $\phi_0$-planes involves piezo-interaction with normal elastic components, as shown by the relation $$h'_{11} = -h'_{12} = -\sqrt{h^2_{11} + h^2_{22}} \cdot \sin(\phi - \phi_0)$$

instead of face shear as in $I_4$ and is, therefore, more serious. For this reason, the class $I_6$ is somewhat less desirable; it is, however, in its properties distinct from, and superior to, the trigonal monocyclic classes, which do not permit unconditionally pure shear and are, therefore, not claimed here, inasmuch as it is even-rank unconditional and as its piezoelectrically conditional single-series pure shear cut is free from undesired interactions of any kind. Figure 10 illustrates the orientation of the cuts.

In the associated dicyclic class $I_{6v} (= D_{3h})$, the secondary element of symmetry fixes $\varphi_0 = 0$, i. e., the crystallographically equivalent X-cuts $$\mod \frac{\pi}{3}$$

are single-series unconditionally pure with $u_3$ and $c_{44}$. They are shown in Figure 11.

As stated previously, there are only two piezoelectric classes in the cubic system, the polar classes T and $T_d$, and they are electro-elastically identical. As they have, in this respect, the symmetry of $V_d$ as referred to any of the three axes $X_i$, the piezo-active single-series unconditionally pure shear cuts are those bisecting two axes and containing the third $$\left(\phi=\frac{\pi}{4}\right)$$

the latter is direction of displacement; wave stiffness $c_{44}$. One of these three equivalent cuts is shown in Fig. 12.

It has been found previously that the fundamental class $C_3$ of the trigonal system admits conditionally pure shear waves only. According to the notations adopted, double-series pure shear vibrations with $u''_2$ and $u'_3$ are possible in $\overline{X}'_0$-cut plates and single-series ones with $u'_1$, in $Y''_0$- and $Z'_0$-cuts; see Figures 3C, D. All these are piezo-active in $C_3$, but the electrical components involved are in all cases, in general, also coupled with all other elastic components because the $\overline{X}'_0$-planes are not even-rank, but only elastic planes of symmetry. This, in connection with the multiple conditionality, makes the class $C_3$ quite unsuited for use in high frequency shear-cut plates. It is evidently outside the domain of the claims of this invention.

In the holoaxial class $D_3$, the three pairs of X-planes are even-rank planes of symmetry, with conditional directions of displacement at general angles with the Z-axis. Crystallographically, these elements of symmetry are digonal axes. They induce, therefore, the properties of the monoclinic class $C_2$, but with the multiplicity 3. It has been found previously that the $\overline{X}'_0$- and $\overline{Y}'_0$- cuts of $C_2$ are single-series conditionally pure with displacement $u_3$ and stiffnesses $$c^{(e)}_{55;44}$$

and that they provide piezoelectric interaction and dielectric-piezoelectric with the face shear mode; in $D_3$, they are $Y'_0$- and $Z'_0$-cuts with $u_1$ and $$\tan 2v_0=\frac{4c_{14}}{c_{11}-c_{12}-2c_{44}}$$

which is a special case of the expression for $C_3$ given previously, but they have otherwise the same relevant properties as in $C_2$, by virtue of which they are, as explained, outside the domain of my claims. They are the cuts claimed for quartz by Mason and Sykes, 1. c., etc.

Similarly as $C_2$ for $D_2$, the monoclinic class $I_1(=C_1)$ is the prototype for the trigonal class $C_{3v}$. Therefore, the three crystallographically equivalent X-cuts are double-series unconditionally pure with wave stiffnesses $$c^{(e)}_{55;66}=\frac{1}{4}(c_{11}-c_{12}+2c_{44})\pm$$

$$\sqrt{\left[\frac{1}{4}(c_{11}-c_{12}-2c_{44})\right]2+c_{14}^2}$$

corresponding to $$c^{(e)}_{55;66}$$

of $I_2$ and with the conditionally oriented displacements $$u_3^{(e)} \text{ and } u_5^{(e)}$$

These cuts are claimed. They are illustrated in Figure 11; while the orientation of their normals is the same as that of the cuts in class $I_{6v}$, it is emphasized again that the two cases have quite different properties. In particular it should not be inferred from the figure that the most desirable contoural shapes and orientations are the same in the two cases. On the contrary, they will, in general, be quite different. This point has been explained in detail before, following the discussion of class $I_2$, and reference is made here to that discussion.

All crystal classes are thereby exhausted. It seems useful for the purpose of surveying the results obtained to represent them in condensed tabulation form. This is done in Figures 13 and 14.

In Table 2, the thirty-two crystal classes are arranged into five main groups, the first group representing the classes admitting piezo-active unconditionally pure shear modes and thus comprising the domain of the invention as hereafter claimed, the last group, the non-piezoelectric classes, while the intermediate three groups contain, consecutively, the piezoelectric classes permitting pure, but only conditionally pure, piezo-active shear modes, those not permitting pure shear modes, and those permitting unconditionally pure, but piezo-inactive, shear modes. The essential group A is subdivided into five subgroups, the order indicating a valuation. Subgroup A1 contains those ideally suited cases which are degenerate in all physical properties up to the fourth rank and free from any undesired interaction; A2 those which while exhibiting this freedom admit a definite number of, with one exception, mutually equivalent cuts only; it is subdivided into the double-series and the single-series cases with and without nonequivalent cuts, the first ones offering the advantage of greater flexibility slightly offset by the conditionality of the displacement directions and the second ones the advantage of double choice in the same crystal, without any conditionality. A3 comprises the totally degenerate cases with piezo-active face shear, A4 and A5 the piezo-conditional classes with piezo-active face shear mode and normal modes, respectively. Group B is subdivided in two.

Table 3 is a table giving all the fundamental data of the claimed cuts. The consecutive arrangement is the same as in group A of Table 2. This table is self-explanatory, but a final remark should be appended to these data: While it has been pointed out before that as far as elastic stiffness is concerned these results hold regardless whether referred to open-circuit (c) or short-circuit operation $$(c^*=c(1-\kappa^2)=c-\frac{h^2}{\beta}$$

or, for that matter, to any impedance condition, and while the same evidently holds for the dielectric stiffness—

$$\beta \text{ or } \beta^*=\beta-\frac{h^2}{c}=\frac{1}{\epsilon}$$

where $\epsilon=$(free) dielectric constant—the expressions for the preferred azimuths $\varphi_0$ of the piezo-conditional cases $I_4$ and $I_6$ presumed open-circuit conditions. For short-circuit operation, the piezo-electric stiffness coefficients $h$ involved would thus have to be replaced by the corresponding piezoelectric coefficients $e$, which are generally used throughout the literature on piezoelectricity and are defined as $$e=\left(\frac{\delta\sigma}{\delta E}\right)_\eta=-\left(\frac{\delta D}{\delta \eta}\right)_E$$

under omission of the double subscripts specifying the particular mode. The connection between the arrays $h$ and $e$ is in the general case a matric relation involving also an elastic or dielectric array, but one of the implications of unconditionality is reduction of this relation to the simple algebraic one:

$$e = -\frac{h}{\beta}$$

This shows that the values of the preferred azimuths $\varphi_0$ are the same in terms of the coefficients $h$ or $e$, i. e., are actually independent of the conditions of electrical operation. This means that the data of Table 3 apply equally to all elastic, piezoelectric and dielectric coefficients, and not only to the stiffness parameters. It also means that the claimed cuts of all the classes of group A including those called "piezo-conditional" are unconditional in operation, i. e., in the sense of the original definition, and thus clearly separated from all other cuts and classes which are not claimed.

Finally, the data for the class $C_2$ as prototype of the conditional group B of Table 2 corresponding to those given in Table 3 for the group A are:

Orientation:  $\phi_0 \bmod \frac{\pi}{2}$; $\tan 2\phi_0 = \frac{2c_{45}}{c_{44}-c_{55}}$  same as for $I_2$ (Fig. 14)

Wave stiffnesses: $c^{(v)}_{44,55} = c_m \pm c_{di}$;

Piezoelectric stiffnesses:
$$\begin{cases} h^{(v)}_{12} = \frac{1}{2}(h_{15}+h_{24}) + \frac{1}{2}(h_{15}-h_{24})\cos 2\phi_0 + \frac{1}{2}(h_{14}+h_{25})\sin 2\phi_0 \\ h^{(v)}_{22} = -\frac{1}{2}(h_{15}-h_{24}) + \frac{1}{2}(h_{15}+h_{24})\cos 2\phi_0 - \frac{1}{2}(h_{14}+h_{25})\sin 2\phi_0 \end{cases}$$

Dielectric stiffnesses:
$$\begin{cases} \beta^{(v)}_{11} = \frac{1}{2}(\beta_{11}+\beta_{22}) + \frac{1}{2}(\beta_{11}-\beta_{22})\cos 2\phi_0 + \beta_{12}\sin 2\phi_0 \\ \beta^{(v)}_{22} = \frac{1}{2}(\beta_{11}+\beta_{22}) - \frac{1}{2}(\beta_{11}-\beta_{22})\cos 2\phi_0 - \beta_{12}\sin 2\phi_0 \end{cases}$$

Direction of displacement: Piezoelectric and dielectric-piezoelectric interaction with face shear mode Although I have described my invention with a certain degree of particularity, it is to be understood that the present disclosure has been made only by way of example.

Table 2.—*Classification of crystal classes from the point of applicability as piezoelectric thickness controlled shear vibrators*

Group A: Classes permitting unconditionally and piezo-conditionally pure piezo-active shear cuts. Contains 13 classes.
  Subgroup A1 (ideally suited)—Classes permitting degenerate cuts free from any unwanted interactions:
    $C_{4v}$, $C_{6v}$ (2 classes)
  Subgroup A2 (very well suited)—Classes permitting definite equivalent cuts free from any unwanted interactions:
    A2a (double-series):
      $I_3(=C_3)$, $C_{3v}$ (2 classes)
    A2b (single-series; two non-equivalent cuts):         (7 classes)
      $C_{3v}$ (1 class)
    A2c (single-series; equivalent cuts only):
      $L_{4v}=V_d$, $L_{6v}(=D_{3h})$, $T$ and $T_d$ (4 classes)
  Subgroup A3 (well suited)—Classes permitting degenerate cuts with piezoelectric interaction with face shear mode:
    $C_4$, $C_6$ (2 classes)
  Subgroup A4 (well suited)—Classes permitting cuts piezo-conditional with respect to desired and to face shear mode only:
    $I_4(=S_4)$ (1 class)
  Subgroup A5 (moderately well suited)—Classes permitting cuts piezo-conditional with respect to desired shear mode and to normal elastic modes:
    $L_6(=C_{3h})$ (1 class)
Group B: Classes permitting conditionally pure shear cuts with undesired piezoelectric and/or dielectric-piezoelectric interactions— (3 classes).
  Subgroup B1—piezoelectric interaction with face shear mode only:
    $C_2$, $D_2$
  Subgroup B2—Piezoelectric and dielectric-piezoelectric interaction with all elastic modes:
    $C_s$
Group C: Piezoelectric classes not admitting pure shear waves:
    $C_1$ (1 class)

Group D: Classes with piezo-inactive unconditionally pure shear waves:
    $D_3$, $D_4$, $D_6$ (3 classes)
Group E: Non-piezoelectric classes (12 classes):
    $C_{11}(=S_2)$, $C_{3h}=C_{3i}$, $V_h=V_b$, $C_{4h}=C_{4i}$, $D_{4h}=D_{4i}$, $C_{6h}=C_{6i}$, $D_{6h}=D_{6i}$, $C_{11}(=S_6)$, $D_{3d}=D_{3i}$, $T=0$, $T_h=T_i$, $O_h=O_i$.

Table 3.—*Data of the cuts of Group A*

| Crystal Class | Orientation of Cuts | Wave Stiffness(es) | Piezoelectric Stiffness(es) | Dielectric Stiffness(es) | Direction(s) of Displacement | Other coupled modes; fixed ratio | Other piezo-conditionally coupled modes |
|---|---|---|---|---|---|---|---|
| $C_{4v}$ $C_{6v}$ | any $\varphi$ | $c_{44}$ | $h_{24}$ | $\beta_1$ | $z$ | none | none. |
| $I_2$ | $Z$ | $c^{(v)}_{44,44}=c_m\pm c_{di}$ | $h_{14}\cos\varphi_0 - h_{24}\sin\varphi_0$; † $h_{24}\sin\varphi_0 + h_{14}\cos\varphi_0$ | $\beta_1$ | $\varphi_0 \bmod \frac{\pi}{2}$† | do | Do. |
| $C_{3v}$ | three; $X$; equivalent | $c^{(v)}_{44}$* | $h_{24}\cos\varphi_0 - h_{24}\sin\varphi_0$; † $-h_{24}\sin\varphi_0 - h_{24}\cos\varphi_0$ | $\beta_1$ | $\varphi_0 \bmod \frac{\pi}{2}$‡ | do | Do. |
| $C_{3v}$ | two; $X$; $Y$; not equivalent. | $c_{44}$; $c_{55}$ | $h_{15}$; $h_{24}$ | $\beta_1$; $\beta_2$ | $z$ | do | Do. |
| $L_{4v}$ | two; $X$; $Y$; equivalent. | $c_{44}$ | $\pm h_{44}$ | $\beta_1$ | $z$ | do | Do. |
| $L_{6v}$ | three; $X$; equivalent. | $c_{44}$ | $h(=h_{11})$ | $\beta_1$ | three $y$ | do | Do. |
| $T$ $T_d$ | three; $\frac{\pi}{4}$, any axis; equivalent. | $c_{44}$ | $h(=h_{14})$ | $\beta$ | any axis | do | Do. |
| $C_4$ $C_6$ | any $\varphi$ | $c_{44}$ | $h_{24}$ | $\beta_1$ | $z$ | face shear | Do. |
| $I_4$ | two equivalent $\varphi_0$; $\tan 2\varphi_0 = \frac{h_{14}}{h_{15}}$ | $c_{44}$ | $\pm\sqrt{h_{24}^2+h_{14}^2}$ | $\beta_1$ | $z$ | none | face shear. |
| $I_6$ | three equivalent $\varphi_0$; $\tan 3\varphi_0 = \frac{h_{11}}{h_{22}}$ | $c_{44}$ | $\pm\sqrt{h_{11}^2+h_{22}^2}$ | $\beta_1$ | $\varphi_0 \pm \frac{\pi}{2}$ | do | normal modes. |

*$\frac{1}{4}(c_{11}-c_{22}+2c_{44}) \pm \sqrt{\left[\frac{1}{4}(c_{11}-c_{22}-2c_{44})\right]^2 + c_{14}^2}$.  † $\tan 2\varphi_0 = \frac{2c_{45}}{c_{44}-c_{55}}$.  ‡ $\tan 2\varphi_0 = \frac{4c_{14}}{c_{11}-c_{22}-2c_{44}}$.

I claim:

1. In a piezoelectric thickness-controlled shear crystal plate: a plate cut from crystalline piezoelectric material whose sole element of axial crystallographic symmetry is a rotation axis of order higher than three; said plate having a pair of plane parallel major faces which substantially contain said axis, the dielectric, piezoelectric, and elastic properties of said plate being independent of the azimuth about said axis.

2. In a piezoelectric thickness-controlled shear crystal plate: a plate cut from crystalline piezoelectric material whose sole element of crystallographic symmetry is a rotation axis of order higher than three, said plate having a pair of plane parallel major faces which substantially contain said axis, the dielectric, piezoelectric, and elastic properties of said plate being independent of the azimuth about said axis.

3. In a piezoelectric thickness-controlled shear crystal plate: a plate cut from crystalline piezoelectric material whose sole elements of crystallographic symmetry are a rotation axis of order higher than three and a plane of crystallographic symmetry containing said axis, said plate having a pair of plane parallel major faces which substantially contain said axis, the dielectric, piezoelectric, and elastic properties of said plate being independent of the azimuth about said axis.

HANS G. BAERWALD.

REFERENCES CITED

The following references are of record in the file of this patent:

UNITED STATES PATENTS

| Number | Name | Date |
| --- | --- | --- |
| 1,717,263 | Rice | June 11, 1929 |
| 2,309,467 | Mason | Jan. 26, 1943 |

OTHER REFERENCES

Cady: "Piezoelectricity," McGraw-Hill, New York, 1946, pages 19 and 20.

Certificate of Correction

Patent No. 2,485,129                                                        October 18, 1949

HANS G. BAERWALD

It is hereby certified that errors appear in the printed specification of the above numbered patent requiring correction as follows:

Column 10, line 5, for that portion of the equation reading "$Q^{-1}_m$" read $Q_m^{-1}$; column 13, lines 9, 13, and 16, column 19, line 32, column 24, lines 51 and 55, column 31, line 47, columns 33 and 34, Table 3, fourth column thereof, fourth and fifth lines under the heading, each occurrence, same table, sixth column thereof, third line under the heading, and right-hand portion of footnote to same Table 3, for "$v$" read $\vartheta$; column 13, line 30, for "$\sigma_{ss} \equiv \sigma'_s$" read $\sigma'_{ss} \equiv \sigma'_s$; column 14, lines 27 and 28, strike out the equation and insert instead $$h'_{ia} = \left(\frac{\delta E'_i}{\delta \eta'_a}\right)_{T_b, T_b, T_l, T_s, T_r, D'_b, D'_l} = \left(\frac{\delta \sigma'_a}{\delta D'_i}\right) same$$

column 15, lines 4 and 5, for that portion of the equation reading $$\text{"}h_{ip} D_k \eta_k + \sum_{l=1}^{3}\sum_{k=1}^{3} \beta_{ik} D_l D_k \Big]: c_{pe} = c_{ep}, \beta_{ia} = \beta_{ai}\text{"}$$

read $$h_{ip} D_k \eta_p + \sum_{l=1}^{3}\sum_{k=1}^{3} \beta_{ik} D_l D_k \Big]; c_{pe} = c_{ep}, \beta_{ia} = \beta_{ai}$$

column 15, line 20, both occurrences, and column 20, line 16, for the subscript "pa" read $p\alpha$; column 21, line 12, for the subscript "pd" read $p\alpha$; column 22, line 74, column 27, line 41, both occurrences, and line 42, for "$\delta$" read $\rho$; column 30, line 55 for "$\cdot \sin(\phi - \phi_0)$" read $\cdot \sin \delta(\phi - \phi_0)$; column 31, line 64, for that portion of the equation reading $$\text{"}\sqrt{\left[\frac{1}{4}(c_{11} - c_{12} - 2c_{44})\right]2 + c_{14}^2}\text{"} \quad \text{read} \quad \sqrt{\left[\frac{1}{4}(c_{11} - c_{12} - 2c_{44})\right]^2 + c_{14}^2}$$

column 33, fifth line above Table 3, for "Direction of displacement:" read *Direction of displacement: Z;* and that the said Letters Patent should be read with these corrections therein that the same may conform to the record of the case in the Patent Office.

Signed and sealed this 28th day of February, A. D. 1950.

[SEAL]

THOMAS F. MURPHY,
*Assistant Commissioner of Patents.*